US012750117B2

(12) United States Patent
Yuan et al.

(10) Patent No.: US 12,750,117 B2
(45) Date of Patent: Sep. 29, 2026

(54) SYSTEMS AND METHODS FOR RESPONDING TO A MAXIMUM PERMISSIBLE EXPOSURE CONDITION

(71) Applicant: QUALCOMM Incorporated, San Diego, CA (US)

(72) Inventors: Fang Yuan, Beijing (CN); Ruiming Zheng, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 429 days.

(21) Appl. No.: 17/757,846

(22) PCT Filed: Jan. 8, 2021

(86) PCT No.: PCT/CN2021/070783
§ 371 (c)(1),
(2) Date: Jun. 22, 2022

(87) PCT Pub. No.: WO2021/147690
PCT Pub. Date: Jul. 29, 2021

(65) Prior Publication Data
US 2023/0036243 A1 Feb. 2, 2023

Related U.S. Application Data

(63) Continuation-in-part of application No. PCT/CN2020/073564, filed on Jan. 21, 2020.

(51) Int. Cl.
*H04B 7/06* (2006.01)
*H04L 5/00* (2006.01)
(Continued)

(52) U.S. Cl.
CPC ....... *H04B 7/06964* (2023.05); *H04L 5/0051* (2013.01); *H04W 52/367* (2013.01); *H04W 76/19* (2018.02); *H04W 80/02* (2013.01)

(58) Field of Classification Search
CPC ... H04W 52/367; H04W 76/19; H04W 80/02; H04L 5/0051; H04B 7/06964; H04B 7/0695
(Continued)

(56) References Cited

U.S. PATENT DOCUMENTS 10,673,479 B2 6/2020 Fernando et al.
2018/0167897 A1* 6/2018 Sampath ............. H04W 52/367
(Continued)

FOREIGN PATENT DOCUMENTS

CN 110536397 A 12/2019
WO 2018183573 10/2018

OTHER PUBLICATIONS

Qualcomm [To be RAN4]: "[DRAFT] LS On MPE Enhancements", TSG-RAN Working Group 4 (Radio) #93, R4-1916171, 3rd Generation Partnership Project, Mobile Competence Centre, 650, Route Des Lucioles, F-06921 Sophia-Antipolis Cedex, France, vol. RAN WG4, No. Reno, Nv, USA, Nov. 18, 2019-Nov. 22, 2019, Nov. 24, 2019, 1 Page, XP051830522, the whole document.
(Continued)

*Primary Examiner* — Nicholas A Jensen
*Assistant Examiner* — Oladiran Gideon Olaleye
(74) *Attorney, Agent, or Firm* — Dinsmore & Shohl LLP

(57) ABSTRACT

This disclosure provides systems, methods and apparatus, including computer programs encoded on computer storage media, for responding to a maximum permissible exposure (MPE) condition in uplink communications. In one aspect, a user equipment (UE) wireless device may detect an MPE condition associated with a cell in an uplink channel from
(Continued)

the UE in the wireless communication network. The UE may configure a medium access control layer control element (MAC-CE) to indicate information related to the cell associated with the detected MPE condition and an alternative beam that avoids an MPE condition for use in uplink communications. The configured MAC-CE may include a synchronization signal/physical broadcast channel resource block indicator (SSBRI) or a channel state information resource indicator (CRI) that indicates an alternative UE panel, a feasible UE panel, Tx beam for UL transmissions or Tx beam for UL transmissions taking into account the detected MPE condition.

28 Claims, 18 Drawing Sheets

(51) Int. Cl.

| | |
|---|---|
| ***H04W 52/36*** | (2009.01) |
| ***H04W 76/19*** | (2018.01) |
| ***H04W 80/02*** | (2009.01) |

(58) Field of Classification Search

USPC .......................................................... 370/318

See application file for complete search history.

(56) References Cited

U.S. PATENT DOCUMENTS

| | | | | |
|---|---|---|---|---|
| 2018/0278318 | A1* | 9/2018 | Chakraborty | H04B 7/0404 |
| 2018/0368081 | A1* | 12/2018 | Akkarakaran | H04W 52/42 |
| 2019/0141692 | A1* | 5/2019 | Subramanian | H04W 72/20 |
| 2019/0159156 | A1* | 5/2019 | Abedini | H04W 48/16 |
| 2019/0200365 | A1* | 6/2019 | Sampath | H04W 52/223 |
| 2019/0305830 | A1* | 10/2019 | Zhou | H04B 7/088 |
| 2020/0145080 | A1* | 5/2020 | Tang | H04B 7/088 |
| 2020/0145927 | A1* | 5/2020 | Sun | H04W 52/146 |
| 2022/0256473 | A1* | 8/2022 | Kiilerich Pratas | H04W 52/367 |

OTHER PUBLICATIONS

Supplementary European Search Report—EP21744275—Search Authority—Munich—Feb. 5, 2024, 7 pages.

International Search Report and Written Opinion—PCT/CN2020/073564—ISA/EPO—Sep. 25, 2020 9 pages.

International Search Report and Written Opinion—PCT/CN2021/070783—ISA/EPO—Apr. 9, 2021 9 pages.

QUALCOMM Incorporated: "Enhancements on Multi-Beam Operation", TSG-RAN WG1 Meeting #97, R1-1907290 Enhancements on Multi-beam Operation, 3rd Generation Partnership Project (3GPP), vol. RAN WG1, May 13, 2019-May 17, 2019, May 13, 2019, XP051728730, XP051709313, pp. 1-26, Retrieved from URL: http://www.3gpp.org/ftp/Meetings%5F3GPP%5FSYNC/RAN1/Docs/R1%2D1907290%2Ezip, http://www.3gpp.org/ftp/tsg%5Fran/WG1%5FRL1/TSGR1%5F97/Docs/R1%2D1907290%2.Ezip, Sections 2-8, Sections 1, 6, 8.2 and 8.4, p. 11.

MEDIA Tek Inc: "Enhancements on Multi-Beam Operations", R1-1908380, 3GPP TSG RAN WG1 #98, Aug. 30, 2019 (Aug. 30, 2019), XP051764989, 13 Pages, the whole document.

* cited by examiner

500a

| | | | | | | | | |
|---|---|---|---|---|---|---|---|---|
| C7 | C6 | C5 | C4 | C3 | C2 | C1 | C0 | Oct1 |
| C15 | C14 | C13 | C12 | C11 | C10 | C9 | C8 | Oct2 |
| AC7 | AC6 | AC5 | AC4 | AC3 | AC2 | AC1 | AC0 | Oct3 |
| AC15 | AC14 | AC13 | AC12 | AC11 | AC10 | AC9 | AC8 | Oct4 |
| R1 | | TCI state ID/RS ID1 | | | | | | Oct5 |
| • • • | | | | | | | | ⋮ |
| RN | | TCI state ID/RS IDN | | | | | | OctN |

FIG. 5A

500b

| | | | | | | | | |
|---|---|---|---|---|---|---|---|---|
| 0 | 1 | 0 | 1 | 0 | 1 | 1 | 0 | Oct1 |
| 0 | 0 | 1 | 0 | 0 | 0 | 0 | 0 | Oct2 |
| 0 | 1 | 0 | 0 | 0 | 1 | 0 | 0 | Oct3 |
| 0 | 0 | 1 | 0 | 0 | 0 | 0 | 0 | Oct4 |
| 0 | 1 | 1 | 0 | 0 | 0 | 0 | 0 | Oct5 |
| • • • | | | | | | | | ⋮ |
| 1 | 0 | 0 | 1 | 0 | 0 | 1 | 0 | OctN |

FIG. 5B

600a

| | | | | | | | |
|---|---|---|---|---|---|---|---|
| C7 | C6 | C5 | C4 | C3 | C2 | C1 | C0 |
| C15 | C14 | C13 | C12 | C11 | C10 | C9 | C8 |
| R1 | AC1 | TCI state ID/RS ID1 | | | | | |
| • • • | | | | | | | |
| RN | ACN | TCI state ID/RS IDN | | | | | |

FIG. 6A

600b

| | | | | | | | |
|---|---|---|---|---|---|---|---|
| 0 | 0 | 1 | 1 | 0 | 0 | 0 | 1 |
| 1 | 0 | 0 | 0 | 0 | 0 | 0 | 0 |
| 0 | 1 | 1 | 1 | 0 | 0 | 1 | 1 |
| • • • | | | | | | | |
| 0 | 0 | 0 | 1 | 0 | 1 | 0 | 1 |

FIG. 6B

700a

| | | | | | | | | |
|---|---|---|---|---|---|---|---|---|
| R | R | AC | Serving Cell ID1 | | | | | Oct1 |
| R1 | | TCI state ID/RS ID 1 | | | | | | Oct2 (optional) |
| • • • | | | | | | | | |
| R | R | AC | Serving Cell IDN | | | | | |
| RN | | TCI state ID/RS ID N | | | | | | OctN (optional) |

FIG. 7A

700b

| | | | | | | | | |
|---|---|---|---|---|---|---|---|---|
| 0 | 0 | 1 | 1 | 0 | 0 | 0 | 1 | Oct1 |
| 1 | 0 | 0 | 0 | 1 | 1 | 0 | 0 | Oct2 (optional) |
| • • • | | | | | | | | |
| 1 | 0 | 0 | 0 | 1 | 1 | 0 | 1 | |

[*OctN (optional)*]

FIG. 7B

800a

<table>
<tr><td>R</td><td>R</td><td>AC</td><td>Serving Cell ID</td></tr>
<tr><td colspan="2">R1</td><td colspan="2">TCI state ID/RS ID</td></tr>
</table>

FIG. 8A

800b

| | | | | | | | |
|---|---|---|---|---|---|---|---|
| 1 | 0 | 1 | 0 | 1 | 1 | 0 | 1 |
| 1 | 1 | 0 | 1 | 0 | 1 | 0 | 0 |

FIG. 8B

900a

| | | | | | | | |
|---|---|---|---|---|---|---|---|
| C7 | C6 | C5 | C4 | C3 | C2 | C1 | R1 |
| C15 | C14 | C13 | C12 | C11 | C10 | C9 | C8 |
| AC7 | AC6 | AC5 | AC4 | AC3 | AC2 | AC1 | R2 |
| AC15 | AC14 | AC13 | AC12 | AC11 | AC10 | AC9 | AC8 |
| R3 | | TCI state ID/RS ID1 | | | | | |
| • • • | | | | | | | |
| RN | | TCI state ID/RS IDN | | | | | |

FIG. 9A

900b

| | | | | | | | |
|---|---|---|---|---|---|---|---|
| 0 | 0 | 0 | 1 | 0 | 0 | 1 | 1 |
| 0 | 0 | 0 | 0 | 0 | 0 | 0 | 0 |
| 0 | 0 | 0 | 1 | 0 | 1 | 0 | 0 |
| 0 | 0 | 1 | 0 | 0 | 0 | 0 | 0 |
| 0 | 1 | 1 | 0 | 0 | 0 | 0 | 0 |
| • • • | | | | | | | |
| 1 | 0 | 0 | 1 | 0 | 0 | 1 | 0 |

FIG. 9B

1000a

| | | | | | | | |
|---|---|---|---|---|---|---|---|
| C7 | C6 | C5 | C4 | C3 | C2 | C1 | R1 |
| C15 | C14 | C13 | C12 | C11 | C10 | C9 | C8 |
| R2 | AC1 | TCI state ID/RS ID1 | | | | | |
| • • • | | | | | | | |
| RN | ACN | TCI state ID/RS IDN | | | | | |

FIG. 10A

1000b

| | | | | | | | |
|---|---|---|---|---|---|---|---|
| 0 | 0 | 1 | 1 | 0 | 0 | 0 | 0 |
| 1 | 0 | 0 | 0 | 0 | 0 | 0 | 0 |
| 0 | 1 | 1 | 1 | 0 | 0 | 1 | 1 |
| • • • | | | | | | | |
| 0 | 0 | 0 | 1 | 0 | 1 | 0 | 1 |

FIG. 10B

1100a

| | | | | |
|---|---|---|---|---|
| R1 | R2 | AC | Serving Cell ID | Oct1 |
| R3 | | TCI state ID/RS ID | | Oct2 |
| • • • | | | | |
| R1 | R2 | AC | Serving Cell ID | |
| R3 | | TCI state ID/RS ID | | |

FIG. 11A

1100b

| | | | | | | | | |
|---|---|---|---|---|---|---|---|---|
| 0 | 0 | 1 | 1 | 0 | 0 | 0 | 1 | Oct1 |
| 0 | 0 | 0 | 0 | 1 | 1 | 0 | 0 | Oct2 |
| • • • | | | | | | | | |
| 1 | 0 | 0 | 0 | 1 | 1 | 0 | 1 | |
| 1 | 1 | 0 | 1 | 0 | 1 | 0 | 0 | |

FIG.11B

1200a

| R | Cell ID0 | Serving Cell ID | BWP ID |
|---|---|---|---|
| T7 | ... | | T0 |
| ... | ... | | ... |
| T(N-2)×8+7 | ... | | T(N-2)×8 |

FIG. 12A

1200b

| R | Cell ID0 | Serving Cell ID | BWP ID |
|---|---|---|---|
| 1 | ... | | 0 |
| ... | ... | | ... |
| 0 | ... | | 1 |

FIG. 12B

1300a

| | | | |
|---|---|---|---|
| R | Cell ID0 | Serving Cell ID | BWP ID |
| S7 | ... | | S0 |

FIG. 13A

1300b

| | | | |
|---|---|---|---|
| R | Cell ID0 | Serving Cell ID | BWP ID |
| 1 | ... | | 0 |

FIG. 13B

1400a

| | | | |
|---|---|---|---|
| R | SRS Resource Set ID | | BWP ID |
| ... | $S_{i-1}$ | $S_i$ | ... |

FIG. 14A

1400b

| | | | |
|---|---|---|---|
| R | ... | | BWP ID |
| ... | 1 | 0 | ... |

FIG. 14B

SYSTEMS AND METHODS FOR RESPONDING TO A MAXIMUM PERMISSIBLE EXPOSURE CONDITION

TECHNICAL FIELD

This disclosure relates generally to user equipment (UE) wireless devices, and more particularly to enabling UE wireless devices to respond to a maximum permissible exposure condition.

DESCRIPTION OF RELATED TECHNOLOGY 5G new radio (NR) communication technologies allow UEs to communicate information at high data rates using millimeter wave frequency bands. Millimeter wave frequency bands may have a higher path loss compared to lower frequency bands used by earlier wireless communication systems. To address the higher path loss, mobile devices and base stations may use beamforming to form directional wireless communication links.

Government regulatory agencies may impose maximum permissible exposure (MPE) constraints on transmitters that may be specified, for example, in terms of radiated power. Imposing of MPE constraints serves to limit operations of transmitters that may be hazardous to health and safety, and reduce electromagnetic pollution or interference from transmitters.

SUMMARY

The systems, methods and devices of this disclosure each have several innovative aspects, no single one of which is solely responsible for the desirable attributes disclosed herein.

One innovative aspect of the subject matter described in this disclosure may be implemented in a wireless mobile communication device, which is referred to herein as user equipment or (UE). Some implementations may include methods performed by a processing system of the UE for responding to an MPE condition in uplink communications with a wireless communication network.

In some implementations, a method for responding to a maximum permissible exposure (MPE) condition in uplink communications with a cell in a wireless communication network may include detecting an MPE condition associated with an uplink channel from the UE to the cell (such as a base station) in the wireless communication network. Some implementations may include configuring a medium access control (MAC) layer control element (MAC-CE) to indicate information related to the cell associated with the detected MPE condition and an alternative beam that avoids an MPE condition for use in uplink communications. Some implementations may include outputting the configured MAC-CE for transmission, for example, to the communication network (such as to a base station e-NodeB).

In some implementations, configuring the MAC-CE to indicate the detected MPE condition may include configuring a bitmap in the MAC-CE that indicates the cell associated with the detected MPE condition. In some implementations, the bitmap in the MAC-CE also may indicate the alternative beam that avoids the MPE condition for use in uplink communications.

In some implementations, the MAC-CE may include a beam failure recovery (BFR) information for a secondary cell. In such implementations, the BFR information may be further configured to indicate that the BFR information is communicating an MPE condition instead of signaling a BFR condition. In some implementations, the MAC-CE may include information related to a physical uplink shared channel (PUSCH) resource. In such implementations, the information related to the PUSCH resource may be further configured to indicate that the PUSCH resource is communicating an MPE condition. In some implementations, the MAC-CE may include information related to a physical uplink control channel (PUCCH) resource. In such implementations, the information related to the PUCCH resource may be further configured to indicate that the PUCCH resource is communicating an MPE condition. In some implementations, the MAC-CE may include a sounding reference signal (SRS) resource set. In such implementations, the MAC-CE may be further configured to indicate that the SRS resource set is communicating an MPE condition.

In some implementations, configuring the MAC-CE to indicate the information related to the cell associated with the detected MPE condition and the alternative beam that avoids the MPE condition for use in uplink communications may include configuring a MAC-CE message that includes an identifier of the cell associated with the detected MPE condition and an identifier of the alternative transmission (Tx) beam that avoids the MPE condition for use in uplink (UL) communications. In some implementations, configuring the MAC-CE message may include configuring the MAC-CE message to include a synchronization signal/physical broadcast channel resource block indicator (SSBRI) or a channel state information resource indicator (CRI) that indicates an alternative UE panel or Tx beam for UL transmissions. In some implementations, configuring the MAC-CE message may include configuring the MAC-CE message to include an SSBRI taking into account the detected MPE condition. In some implementations, configuring the MAC-CE message may include configuring the MAC-CE message to include a channel state information resource indicator (CRI) that indicates a feasible UE panel or Tx beam for UL transmissions taking into account the detected MPE condition. In some implementations, the MAC-CE may be a BFR information for a secondary cell. In such implementations, the BFR information further may be configured to indicate that the BFR information is communicating an MPE condition instead of signaling a BFR condition. In some implementations, the MAC-CE may include information related to a PUSCH resource. In such implementations, the information related to the PUSCH resource may be further configured to indicate that the PUSCH resource is communicating an MPE condition. In some implementations, the MAC-CE may include information related to a PUCCH resource. In such implementations, the information related to the PUCCH resource may be further configured to indicate that the PUCCH resource is communicating an MPE condition. In some implementations, the MAC-CE may be an SRS resource set. In such implementations, the SRS resource set may be further configured to that indicate that the SRS resource set is communicating an MPE condition.

Some implementations include apparatus of a UE, which may include a first interface configured to output a configured MAC-CE for transmission, and a processing system coupled to the first interface and configured to detect a maximum permissible exposure (MPE) condition associated with a cell in an uplink channel from the UE in a wireless communication network, configure a MAC-CE to indicate information related to the cell associated with the detected MPE condition and an alternative beam that avoids an MPE condition for use in uplink communications, and output the configured MAC-CE for transmission.

In some implementations, the processing system may be further configured to configure a bitmap in the MAC-CE that indicates the cell associated with the detected MPE condition. In some implementations, the processing system may be further configured such that the bitmap in the MAC-CE also indicates an alternative cell that avoids the MPE condition for use in uplink communications. In some implementations, the processing system may be further configured to configure the MAC-CE including a BFR information for a secondary cell indicating that the BFR information is communicating an MPE condition instead of signaling a BFR condition. In some implementations, the processing system may be further configured to configure the MAC-CE including information related to a PUSCH resource configured to indicate that the PUSCH resource is communicating an MPE condition. In some implementations, the processing system may be further configured to configure the MAC-CE including information related to a PUCCH resource configured to indicate that the PUCCH resource is communicating an MPE condition. In some implementations, the processing system may be further configured to configure the MAC-CE including an SRS resource set that indicates that the SRS resource set is communicating an MPE condition.

In some implementations, the processing system may be further configured to configure a MAC-CE message that includes an identifier of the cell associated with the detected MPE condition and an identifier of an alternative cell that avoids the MPE condition for use in uplink communications. In some implementations, the processing system may be further configured to configure the MAC-CE to include a SSBRI or a CRI that indicates an alternative UE panel or Tx beam for UL transmissions. In some implementations, the processing system may be further configured to configure the MAC-CE to include a SSBRI or a CRI that indicates a feasible UE panel or Tx beam for UL transmissions taking into account the detected MPE condition. In some implementations, the processing system may be further configured to configure a BFR information for a secondary cell indicating that the BFR information is communicating an MPE condition instead of signaling a BFR condition. In some implementations, the processing system may be further configured to configure the MAC-CE including information related to a PUSCH resource and indicating that the PUSCH resource is communicating an MPE condition. In some implementations, the processing system may be further configured to configure the MAC-CE including information related to a PUCCH resource and indicating that the PUCCH resource is communicating an MPE condition. In some implementations, the processing system may be further configured to configure the MAC-CE including an SRS resource set that indicates that the SRS resource set is communicating an MPE condition.

Some implementations may include non-transitory processor-readable medium having stored thereon processor-executable instructions configured to cause a UE processing system to perform operations including detecting a maximum permissible exposure (MPE) condition associated with a cell in an uplink channel from the UE in a wireless communication network, configuring a MAC-CE to indicate information related to the cell associated with the detected MPE condition and an alternative beam that avoids an MPE condition for use in uplink communications, and outputting the configured MAC-CE for transmission.

In some implementations, the stored processor-executable instructions may be configured to cause the UE processing system to perform operations such that configuring the MAC-CE to indicate the detected MPE condition may include configuring a bitmap in the MAC-CE that indicates the cell associated with the detected MPE condition. In some implementations, the stored processor-executable instructions may be configured to cause the UE processing system to perform operations such that the bitmap in the MAC-CE also indicates the alternative beam that avoids the MPE condition for use in uplink communications. In some implementations, the stored processor-executable instructions may be configured to cause the UE processing system to perform operations such that configuring the MAC-CE to indicate the detected MPE condition may include configuring a BFR information for a secondary cell indicating that the BFR information is communicating an MPE condition instead of signaling a BFR condition. In some implementations, the stored processor-executable instructions may be configured to cause the UE processing system to perform operations such that configuring the MAC-CE to indicate the detected MPE condition may include including information related to a PUSCH resource and indicating that the PUSCH resource is communicating an MPE condition. In some implementations, the stored processor-executable instructions may be configured to cause the UE processing system to perform operations such that configuring the MAC-CE to indicate the detected MPE condition may include information related to a PUCCH resource and indicating that the PUCCH resource is communicating an MPE condition. In some implementations, the stored processor-executable instructions may be configured to cause the UE processing system to perform operations such that configuring the MAC-CE to indicate the detected MPE condition may include configuring the MAC-CE including an SRS resource set that indicates that the SRS resource set is communicating an MPE condition.

In some implementations, the stored processor-executable instructions may be configured to cause the UE processing system to perform operations such that configuring the MAC-CE to indicate the information related to the cell associated with the detected MPE condition and the alternative beam that avoids the MPE condition for use in uplink communications may include configuring a MAC-CE message that includes an identifier of the cell associated with the detected MPE condition and an identifier of the alternative beam that avoids the MPE condition for use in uplink communications. In some implementations, the stored processor-executable instructions may be configured to cause the UE processing system to perform operations such that configuring the MAC-CE to indicate the detected MPE condition may include configuring the MAC-CE to include a SSBRI or a CRI that indicates an alternative UE panel or Tx beam for UL transmissions. In some implementations, the stored processor-executable instructions may be configured to cause the UE processing system to perform operations such that configuring the MAC-CE to indicate the detected MPE condition may include configuring the MAC-CE to include a SSBRI or a CRI that indicates a feasible UE panel or Tx beam for UL transmissions taking into account the detected MPE condition. In some implementations, the stored processor-executable instructions may be configured to cause the UE processing system to perform operations such that configuring the MAC-CE to indicate the detected MPE condition may include configuring a BFR information for a secondary cell indicating that the BFR information is communicating an MPE condition instead of signaling a BFR condition. In some implementations, the stored processor-executable instructions may be configured to cause the UE processing system to perform operations such that configuring the MAC-CE to indicate the detected MPE condition may include including information related to a PUSCH resource and indicating that the PUSCH resource is communicating an MPE condition. In some implementations, the stored processor-executable instructions may be configured to cause the UE processing system to perform operations such that configuring the MAC-CE to indicate the detected MPE condition may include including information related to a PUCCH resource and indicating that the PUCCH resource is communicating an MPE condition. In some implementations, the stored processor-executable instructions may be configured to cause the UE processing system to perform operations such that configuring the MAC-CE to indicate the detected MPE condition may include configuring the MAC-CE including an SRS resource set that indicates that the SRS resource set is communicating an MPE condition.

Some implementations may include a UE that may include means for detecting a maximum permissible exposure (MPE) condition associated with a cell in an uplink channel from the UE in a wireless communication network, means for configuring a MAC-CE to indicate information related to the cell associated with the detected MPE condition and an alternative beam that avoids an MPE condition for use in uplink communications, and means for outputting the configured MAC-CE for transmission.

In some implementations, means for configuring the MAC-CE to indicate the detected MPE condition may include means for configuring a bitmap in the MAC-CE that indicates the cell associated with the detected MPE condition. In some implementations, the bitmap in the MAC-CE also indicates the alternative beam that avoids the MPE condition for use in uplink communications. In some implementations, means for configuring the MAC-CE to indicate the detected MPE condition may include means for configuring a BFR information for a secondary cell indicating that the BFR information is communicating an MPE condition instead of signaling a BFR condition. In some implementations, means for configuring the MAC-CE to indicate the detected MPE condition may include means for configuring the MAC-CE including information related to a PUSCH resource and indicating that the PUSCH resource is communicating an MPE condition. In some implementations, means for configuring the MAC-CE to indicate the detected MPE condition may include means for configuring the MAC-CE including information related to a PUCCH resource and indicating that the PUCCH resource is communicating an MPE condition. In some implementations, means for configuring the MAC-CE to indicate the detected MPE condition may include means for configuring an SRS resource set that indicates that the SRS resource set is communicating an MPE condition.

In some implementations, means for configuring the MAC-CE to indicate the information related to the cell associated with the detected MPE condition and the alternative beam that avoids the MPE condition for use in uplink communications may include means for configuring a MAC-CE message that includes an identifier of the cell associated with the detected MPE condition and an identifier of the alternative beam that avoids the MPE condition for use in uplink communications. In some implementations, means for configuring the MAC-CE message that includes an identifier of the cell associated with the detected MPE condition and an identifier of the alternative Tx beam that avoids the MPE condition for use in UL communications may include means for configuring the MAC-CE message to include a SSBRI or a CRI that indicates an alternative UE panel or Tx beam for UL transmissions. In some implementations, means for configuring the MAC-CE message that includes an identifier of the cell associated with the detected MPE condition and an identifier of the alternative Tx beam that avoids the MPE condition for use in UL communications may include means for configuring the MAC-CE message to include a SSBRI or a CRI that indicates a feasible UE panel or Tx beam for UL transmissions taking into account the detected MPE condition. In some implementations, means for configuring a MAC-CE message that includes an identifier of the cell associated with the detected MPE condition and an identifier of the alternative beam that avoids the MPE condition for use in uplink communications may include means for configuring a BFR information for a secondary cell indicating that the BFR information is communicating an MPE condition instead of signaling a BFR condition. In some implementations, means for configuring a MAC-CE message that includes an identifier of the cell associated with the detected MPE condition and an identifier of the alternative beam that avoids the MPE condition for use in uplink communications may include means for configuring a MAC-CE message including information related to a PUSCH resource indicating that the PUSCH resource is communicating an MPE condition. In some implementations, means for configuring a MAC-CE message that includes an identifier of the cell associated with the detected MPE condition and an identifier of the alternative beam that avoids the MPE condition for use in uplink communications may include means for configuring a MAC-CE message including information related to a PUCCH resource indicating that the PUCCH resource is communicating an MPE condition. In some implementations, means for configuring a MAC-CE message that includes an identifier of the cell associated with the detected MPE condition and an identifier of the alternative beam that avoids the MPE condition for use in uplink communications may include means for configuring the MAC-CE including an SRS resource set that indicates that the SRS resource set is communicating an MPE condition.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIGS. 5A-14B show block diagrams illustrating example configurations of one or more portions of a MAC-CE for responding to an MPE condition in uplink communications with a wireless communication network.

Like reference numbers and designations in the various drawings indicate like elements.

DETAILED DESCRIPTION

Figure 1:
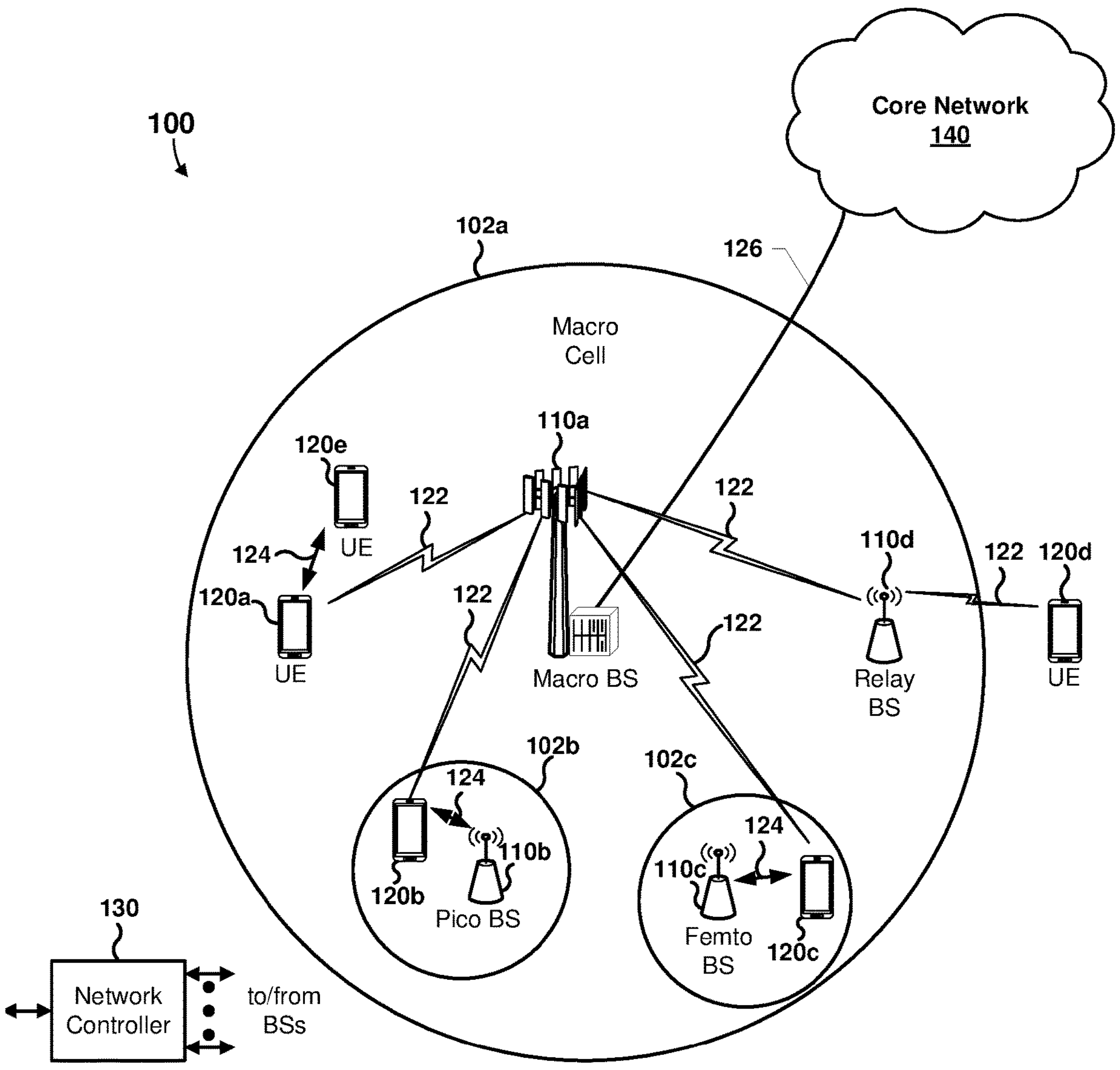
FIG. 1 shows a system block diagram illustrating an example communications system.

The following description is directed to certain implementations for the purposes of describing the innovative aspects of this disclosure. However, a person having ordinary skill in the art will readily recognize that the teachings herein may be applied in a multitude of different ways.

The described implementations may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other signals that are used to communicate within a wireless, cellular or Internet of Things (IoT) network, such as a system utilizing 3G, 4G, or 5G technology, or further implementations thereof.

Various implementations enable UE to quickly and efficiently report an MPE condition in uplink communications with a wireless communication network, such as in one or more beams between a UE and a cell or base station. In various implementations, a processing system of a UE may configure one or more portions of a MAC-CE to include information indicating an MPE condition in a beam, and indicating an alternative beam that avoids the MPE condition (that is, an alternative beam the use of which will not experience or result in an MPE condition). In some implementations, the processing system may indicate a beam experiencing an MPE condition, or an alternative beam, with a single bit.

In some implementations, the processing system may encode information in a bitmap in the MAC-CE. In some implementations, the bitmap may include a cell index that indicates one or more beams with an MPE condition and one or more alternative beams. In some implementations, the processing system may encode information in a byte or field in the MAC-CE. In some implementations, the processing system may use a cell index ID to indicate a beam experiencing an MPE condition, or an alternative beam. In some implementations, the indication may share a logical channel ID with BFR information for a secondary cell. In some implementations, the processing system may indicate whether the BFR information indicates MPE-related information.

In some implementations, the processing system may configure information in the MAC-CE related to a PUSCH resource, such as Transmission Configuration Information (TCI) state information for the PUSCH, to include MPE information. In some implementations, the processing system may configure information in the MAC-CE related to a PUCCH, such as an information element (for example, the spatialrelationinfoid information element or another suitable information element), to include MPE information. In some implementations, the process may configure an SRS resource set to include MPE information. In some implementations, the configured information may include an explicit identifier of a beam associated with a detected MPE condition, or an explicit identifier of an alternative beam that will avoid the MPE condition.

Particular implementations of the subject matter described in this disclosure can be implemented to realize one or more of the following potential advantages. Some implementations may improve the operations of a UE and a communication network by rapidly communicating to the wireless communication network the existence of an MPE condition as well as identifying one or more mitigation strategies for the MPE condition. Communicating this information may enable the communication network to configure the UE to communicate uplink signals using a beam that is not subject to an MPE condition so as to enable fast uplink beam switching and reduce interruptions for uplink transmissions.

The term "user equipment" (UE) is used herein to refer to any of a variety of wireless devices, including for example cellular telephones, smartphones, wireless router devices, wireless appliances, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (such as smart rings, smart bracelets, etc.), entertainment devices (such as wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and an apparatus including a programmable processing system.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single UE. The proximity of the SOCs facilitates high speed communications and the sharing of memory and resources.

FIG. 1 shows a system block diagram illustrating an example communications system 100. The communications system 100 may be an 5G NR network, or any other suitable network such as an LTE network.

The communications system 100 may include a heterogeneous network architecture that includes a core network 140 and a variety of mobile devices (illustrated as UE 120*a*-120*e* in FIG. 1). The communications system 100 also may include a number of base stations (illustrated as the BS 110*a*, the BS 110*b*, the BS 110*c*, and the BS 110*d*) and other network entities. A base station is an entity that communicates with UEs (such as mobile devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110*a*-110*d* may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110*a* may be a macro BS for a macro cell 102*a*, a base station 110*b* may be a pico BS for a pico cell 102*b*, and a base station 110*c* may be a femto BS for a femto cell 102*c*. A base station 110*a*-110*d* may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110*a*-110*d* may be interconnected to one another as well as to one or more other base stations or network nodes (not illustrated) in the communications system 100 through various types of backhaul interfaces, such as a direct physical connection, a virtual network, or a combination thereof using any suitable transport network The base station 110*a*-110*d* may communicate with the core network 140 over a wired or wireless communication link 126. The UE 120*a*-120*e* may communicate with the base station 110*a*-110*d* over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110*d*). A relay station is an entity that can receive a transmission of data from an upstream station (for example, a base station or a mobile device) and send a transmission of the data to a downstream station (for example, a UE or a base station). A relay station also may be a UE that can relay transmissions for other UEs. In the example illustrated in FIG. 1, a relay station 110*d* may communicate with macro the base station 110*a* and the UE 120*d* in order to facilitate communication between the base station 110*a* and the UE 120*d*. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The UEs 120*a*, 120*b*, 120*c* may be dispersed throughout communications system 100, and each UE may be stationary or mobile. A UE also may be referred to as an access terminal, a terminal, a mobile station, a subscriber unit, a station, etc.

A macro base station 110*a* may communicate with the communication network 140 over a wired or wireless communication link 126. The UEs 120*a*, 120*b*, 120*c* may communicate with a base station 110*a*-110*d* over a wireless communication link 122.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, CDMA, Wideband Code Division Multiple Access (WCDMA), Worldwide Interoperability for Microwave Access (WiMAX), TDMA, and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (such as LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a “resource block”) may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, various implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per UE. Multi-layer transmissions with up to 2 streams per UE may be supported. Aggregation of multiple cells may be supported with up to eight serving cells. Alternatively, NR may support a different air interface, other than an OFDM-based air interface.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some implementations, two or more mobile devices 120*a*-120*e* (for example, illustrated as the UE 120*a* and the UE 120*e*) may communicate directly using one or more sidelink channels 124 (for example, without using a base station 110*a* as an intermediary to communicate with one another).

Figure 2:
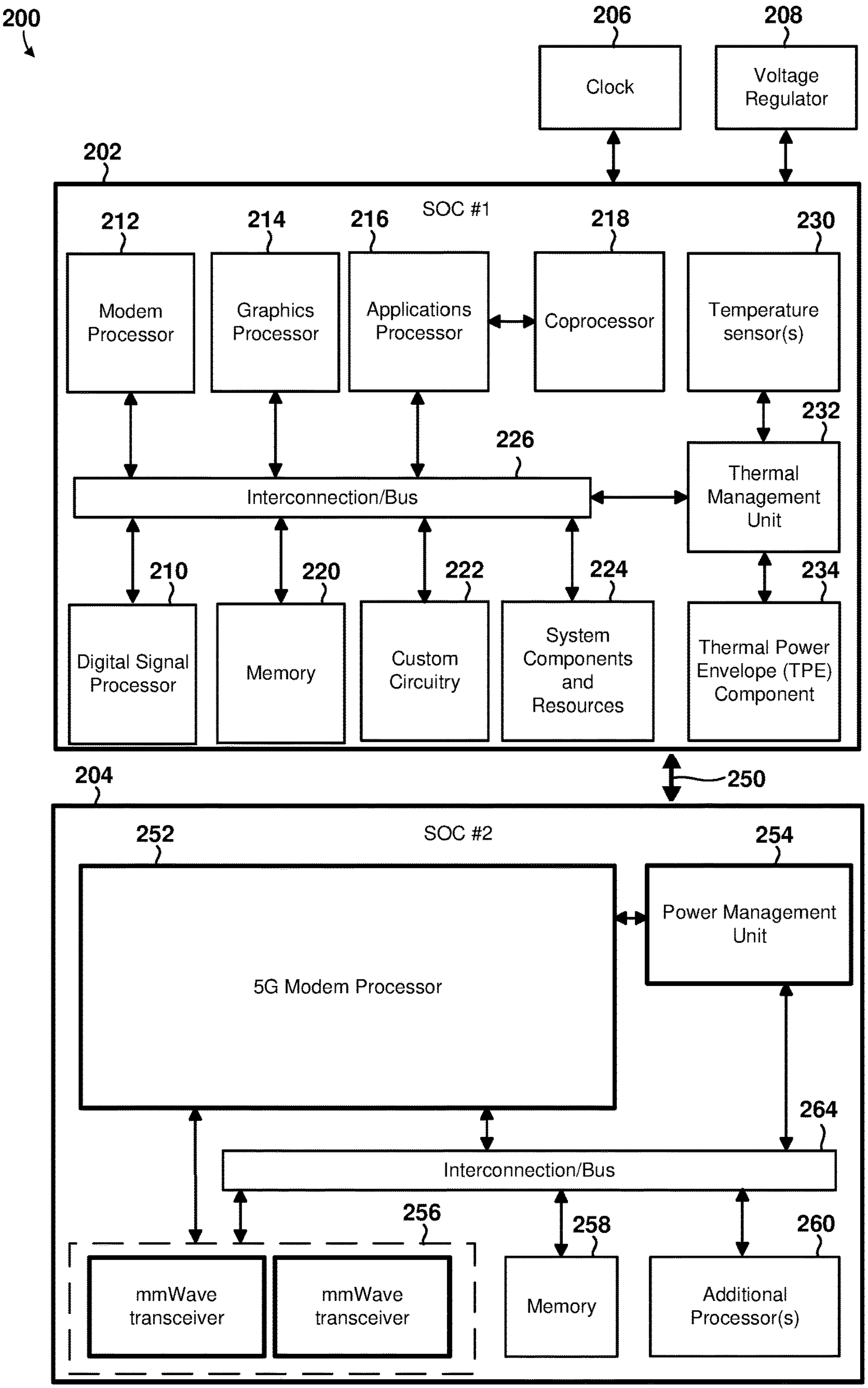
FIG. 2 shows a component block diagram illustrating an apparatus of a wireless device including a processing system that may be configured to respond to an MPE condition in uplink communications with a wireless communication network.

FIG. 2 shows a component block diagram apparatus 200 of a UE including a processing system 202, 204 that may be configured to respond to a maximum permissible exposure (MPE) condition in uplink communications with a wireless communication network. Various implementations may be implemented on a number of single processor and multi-processor processing systems, including a system-on-chip (SOC) or system in a package (SIP). The example illustrated in FIG. 2 is an apparatus 200 architecture including one or the other of the processing system SOCs 202, 204 that may be configured to execute operations of the various implementations.

With reference to FIGS. 1 and 2, the illustrated apparatus 200 includes two processing system SOCs 202, 204, a clock 206, and a voltage regulator 208. In some implementations, the first processing system SOC 202 may operate as central processing unit (CPU) of the UE that carries out the instructions of software application programs by performing the arithmetic, logical, control and input/output (I/O) operations specified by the instructions. In some implementations, the second processing system SOC 204 may operate as a specialized processing unit. For example, the second processing system SOC 204 may operate as a specialized 5G processing system responsible for managing high volume, high speed (such as 5 Gbps, etc.), or very high frequency short wave length (such as 28 GHz mmWave spectrum, etc.) communications.

The first processing system SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second processing system SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first processing system SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.). In some implementations, any or all of the processors 210, 212, 214, 216, 218, 252, 260 may be a component of a processing system. A processing system may generally refer to a system or series of machines or components that receives inputs and processes the inputs to produce a set of outputs (which may be passed to other systems or components of, for example, the first processing system SOC 202 or the second processing system SOC 250). For example, a processing system of the first processing system SOC 202 or the second processing system SOC 250 may refer to a system including the various other components or subcomponents of the first processing system SOC 202 or the second processing system SOC 250.

The processing system of the first processing system SOC 202 or the second processing system SOC 250 may interface with other components of the first processing system SOC 202 or the second processing system SOC 250, and may process information received from other components (such as inputs or signals), output information to other components, etc. For example, a chip or modem of the first processing system SOC 202 or the second processing system SOC 250 may include a processing system, a first interface to output information, and a second interface to receive information. In some cases, the first interface may refer to an interface between the processing system of the chip or modem and a transmitter, such that the first processing system SOC 202 or the second processing system SOC 250 may transmit information output from the chip or modem. In some cases, the second interface may refer to an interface between the processing system of the chip or modem and a receiver, such that the first processing system SOC 202 or the second processing system SOC 250 may receive information or signal inputs, and the information may be passed to the processing system. A person having ordinary skill in the art will readily recognize that the first interface also may receive information or signal inputs, and the second interface also may transmit information.

The first and second processing systems SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first processing system SOC 202 may include power amplifiers, voltage regulators, oscillators, phase-locked loops, peripheral bridges, data controllers, memory controllers, system controllers, access ports, timers, and other similar components used to support the processors and software clients running on a UE. The system components and resources 224 or custom circuitry 222 also may include circuitry to interface with peripheral devices, such as cameras, electronic displays, wireless communication devices, external memory chips, etc.

The first and second processing systems SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second processing systems SOCs 202, 204 may further include an input/output module (not illustrated) for communicating with resources external to the processing system SOC, such as a clock 206 and a voltage regulator 208. Resources external to the processing system SOC (such as clock 206, voltage regulator 208) may be shared by two or more of the internal SOC processors/cores.

In addition to the apparatus 200 discussed above, various implementations may be implemented in a wide variety of processing systems, which may include a single processor, multiple processors, multicore processors, or any combination thereof.

Figure 3:
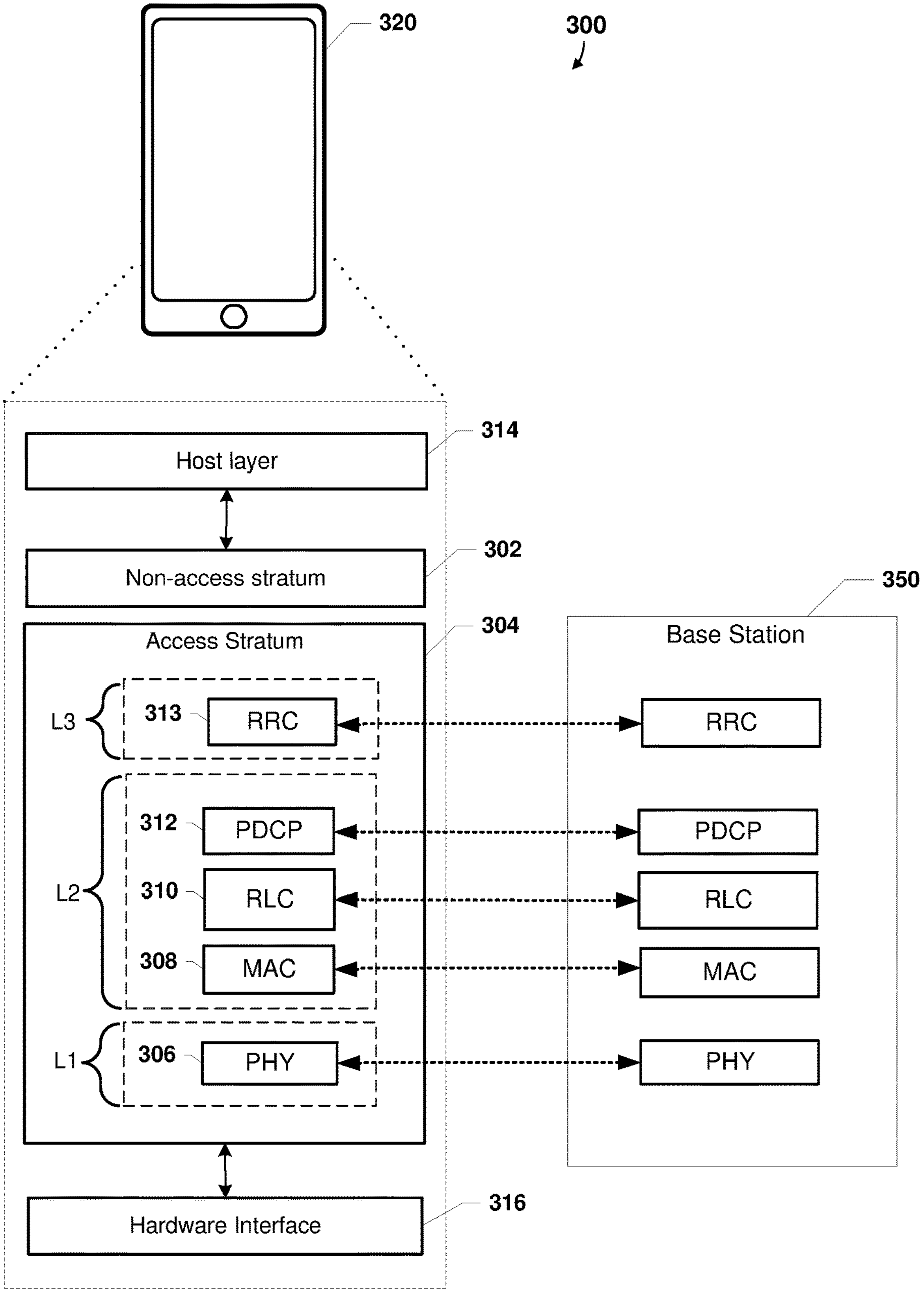
FIG. 3 shows a component block diagram of an example of a software architecture including a radio protocol stack for the user and control planes in wireless communications.

FIG. 3 shows a component block diagram of an example of a software architecture 300 including a radio protocol stack for the user and control planes in wireless communications. The software architecture 300 including a radio protocol stack for the user and control planes in wireless communications between a base station 350 (such as the base station 110*a*) and a UE 320 (such as the UE 120*a*-120*e*, 200). With reference to FIGS. 1-3, the UE 320 may implement the software architecture 300 to communicate with the base station 350 of a communication system (such as the communications system 100). In various implementations, layers in software architecture 300 may form logical connections with corresponding layers in software of the base station 350. The software architecture 300 may be distributed among one or more processors (such as the processors 212, 214, 216, 218, 252, 260). While illustrated with respect to one radio protocol stack, in a multi-SIM (subscriber identity module) UE, the software architecture 300 may include multiple protocol stacks, each of which may be associated with a different SIM (such as two protocol stacks associated with two SIMs, respectively, in a dual-SIM wireless communication device). While described below with reference to LTE communication layers, the software architecture 300 may support any of variety of standards and protocols for wireless communications, or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the UE (such as SIM(s) 204) and its core network 140. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the UE 320 and the base station 350 over the physical layer 306. In the various implementations, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various implementations, the RRC sublayer 313 may provide functions INCLUDING broadcasting system information, paging, and establishing and releasing an RRC signaling connection between the UE 320 and the base station 350.

In various implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the UE 320. In some implementations, application-specific functions provided by the at least one host layer 314 may provide an interface between the software architecture and the general purpose processor 206.

In other implementations, the software architecture 300 may include one or more higher logical layer (such as transport, session, presentation, application, etc.) that provide host layer functions. For example, in some implementations, the software architecture 300 may include a network layer (such as IP layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

Figure 4:
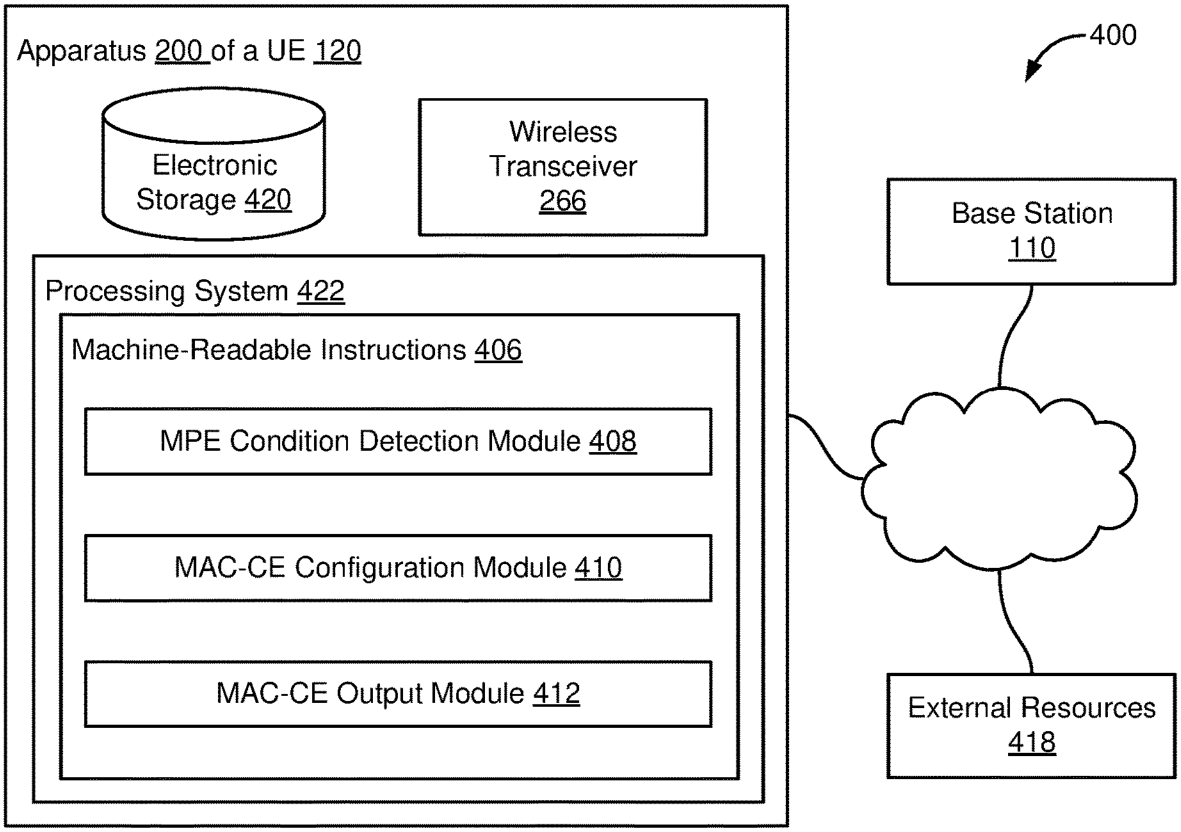
FIG. 4 shows a component block diagram illustrating an example system configured to respond to an MPE condition in uplink communications with a wireless communication network.

FIG. 4 shows a component block diagram illustrating an example system 400 that may be implemented in an apparatus 200 of a UE 120 and configured to respond to an MPE condition in uplink communications with a wireless communication network. In some implementations, the system 400 may include a UE 120 and one or more remote platforms 404. With reference to FIGS. 1-4, the system 400 may include a base station 404 (such as the base station 110, 350) and a UE 120 (such as the UE 120*a*-120*e*, 200, 320). Remote platform(s) 404 may include a base station (such as the base station 110, 350) or a UE (such as the UE 120*a*-120*e*, 200, 320). External resources 418 may include sources of information outside of the system 400, external entities participating with the system 400, or other resources.

The processing system 422 within an apparatus of a UE 120 may be configured by machine-readable instructions 406. Machine-readable instructions 406 may include one or more instruction modules. The instruction modules may include computer program modules. The instruction modules may include one or more of an MPE condition detection module 408, a MAC-CE configuration module 410, a MAC-CE output module 412, and other instruction modules.

The MPE condition detection module 408 may be configured to detect an MPE condition associated with a beam in an uplink channel from the UE to a base station of the wireless communication network.

The MAC-CE configuration module 410 may be configured to configure a MAC-CE to indicate the beam associated with the detected MPE condition and an alternative beam that avoids the MPE condition for use in uplink communications.

The MAC-CE configuration module 410 may be configured to includes configure a MAC-CE message that includes an identifier of the beam associated with the detected MPE condition and an identifier of the alternative beam that will avoid the MPE condition for use in uplink communications. In some implementations, the MAC-CE configuration module 410 may be configured to configure the MAC-CE message in block 1504 to include an SSBRI or a CRI that indicates an alternative UE panel or Tx beam for UL transmissions. In some implementations, the MAC-CE configuration module 410 may be configured to configure the MAC-CE message in block 1504 to include an SSBRI or a CRI that indicates a feasible UE panel or Tx beam for UL transmissions taking into account the detected MPE condition.

In some implementations, the MAC-CE may include beam failure recovery (BFR) information for a secondary cell. In some implementations, the BFR information may be further configured to indicate that the BFR information is communicating an MPE condition instead of signaling a BFR condition. In some implementations, the MAC-CE may include a PUSCH resource. In some implementations, the PUSCH resource may be further configured to indicate that the PUSCH resource is communicating an MPE condition. In some implementations, the MAC-CE may include a PUCCH resource. In some implementations, the PUCCH resource may be further configured to indicate that the PUCCH resource is communicating an MPE condition. In some implementations, the MAC-CE may include an SRS resource set. In some implementations, the MAC-CE may be further configured to indicate that the SRS resource set is communicating an MPE condition.

In some implementations, the MAC-CE may be a beam failure recovery (BFR) resource for a secondary cell. In some implementations, the BFR information further configured to indicate that the BFR information may be communicating an MPE condition instead of signaling a BFR condition. In some implementations, the MAC-CE may include a PUSCH resource. In some implementations, the PUSCH resource may be further configured to indicate that the PUSCH resource is communicating an MPE condition. In some implementations, the MAC-CE may include a PUCCH resource. In some implementations, the PUCCH resource may be further configured to indicate that the PUCCH resource is communicating an MPE condition. In some implementations, the MAC-CE may be an SRS resource set. In some implementations, the SRS resource set may be further configured to that indicate that the SRS resource set is communicating an MPE condition.

The MAC-CE transmittal module 412 may be configured to transmit the configured MAC-CE to the base station. The MAC-CE transmittal module 412 may be configured to configure a bitmap in the MAC-CE that indicates the beam associated with the detected MPE condition. The bitmap in the MAC-CE also may indicate in the bitmap the alternative beam that will avoid the MPE condition for use in uplink communications.

FIGS. 5A-14B show block diagrams illustrating example configurations of one or more portions of a MAC-CE for responding to an MPE condition in uplink communications with a wireless communication network. With reference to FIG. 1-14B, the one or more portions of the MAC-CE may be configured by a processing system (such as 422) of an apparatus (such as 200) of a UE 120 (such as the UE 120*a*-120*e*, 200, 320, 402) or a base station (such as 110, 110*a*-110*d*, 350).

Referring to FIGS. 5A and 5B, the processing system may configure a bitmap 500*a*, 500*b* to indicate one or more cells that may result in an MPE condition, or one or more alternative beams that will avoid the MPE condition in the corresponding cells. For example, the processing system may set a bit (such as one of bits C0-C15) in Octet 1 (Oct1) or Octet 2 (Oct2) to indicate that an MPE condition is detected, or is not detected, for a cell that corresponds with the bit. In some implementations, the cell may correspond with an identifier (such as a serving cell index (ServCellIndex)) that is indicated by one of bits C0-C15. In some implementations, the processing system may set a bit to "1" to indicate that an MPE condition is detected, and to "0" to indicate that an MPE condition is not detected.

In some implementations, to indicate an alternative beam the use of which will avoid the MPE condition on a cell, the processing system may set a bit (such as one of bits AC0-AC15) in Octet 3 (Oct3) or Octet 4 (Oct4). In some implementations, the processing system may set a bit to "1" to indicate that a beam is a viable alternative beam, and to "0" to indicate that a beam is not a viable alternative beam. For example, if C1 is set to "1" while AC1 is set to "0", this bitmap may mean no alternative beam for serving cell index 1; if C1 is set to "1" while AC1 is set to "1", this bitmap may mean there is alternative beam for serving cell index 1.

For example, the processing system may set bit C1 (FIG. 5A) to "1" (FIG. 5B) to indicate that an MPE condition is detected in a corresponding beam. As another example, the processing system may set bit AC1 (FIG. 5A) to "1" (FIG. 5B) to indicate that a corresponding beam is a viable alternative beam for use in uplink communications. As another example, the processing system may set bit C2 (FIG. 5A) to "1" to indicate that an MPE condition is detected in a corresponding beam, and may set bit AC2 (FIG. 5B) to "0" to indicate that there is no alternative beam for the corresponding serving cell index.

In some implementations, the processing system may include additional information in the bitmap 500*a*, 500*b*. For example, the processing system may include information related to a Transmission Configuration Indicator (TCI) state or a reference signal (RS) identifier for a corresponding beam. In some implementations, the processing system may use one reserved bit (such as reserved bits R1 . . . . RN) to indicate that information about a TCI state ID is included in subsequent bits (such as the remaining bits in Octet 5 (Oct 5) . . . . Octet N (OctN)). In some implementations, the processing system may use two reserved bits (such as from among reserved bits R1 . . . . RN) to indicate that information about a reference signal (RS ID) is included in in subsequent bits (such as the remaining bits in Octet 5 (Oct 5) . . . . Octet N (OctN)).

Referring to FIGS. 6A and 6B, the processing system may configure bitmap 600*a*, 600*b* to indicate one or more cells that may result in an MPE condition, or one or more alternative beams that will avoid the MPE condition on the corresponding cells. For example, the processing system may set a bit, such as one of bits C0-C15, to indicate that an MPE condition is detected, or is not detected, for a cell that corresponds with the bit. In some implementations, the cell may correspond with an identifier (such as a serving cell index (ServCellIndex)) that is indicated by one of bits C0-C15. In some implementations, the processing system may set a bit to "1" to indicate that an MPE condition is detected, and to "0" to indicate that an MPE condition is not detected. For example, the processing system may set bit C0 (FIG. 6A) to "1" (FIG. 6B) to indicate that an MPE condition is detected in a corresponding beam.

In some implementations, the processing system may set one of the bits AC1 . . . . ACN to indicate an alternative beam the use of which will avoid the MPE condition. For example, the processing system may set bit AC1 (FIG. 6A) to "1" (FIG. 6B) to indicate that a corresponding beam is usable as an alternative cell.

In some implementations, the processing system also may include additional information in the bitmap 600*a*, 600*b*. For example, the processing system may include information related to a Transmission Configuration Indicator (TCI) state or a reference signal (RS) identifier for a corresponding beam. In some implementations, the processing system may use one reserved bit (such as reserved bits R1 . . . . RN) to indicate that information about a TCI state ID is included in subsequent bits (such as the bits indicated as TCI state ID/RS ID 1 . . . . TCI state ID/RS ID N). In some implementations, the processing system may use two reserved bits (such as from among reserved bits R1 . . . . RN) to indicate that information about a reference signal (RS ID) is included in in subsequent bits (such as the bits indicated as TCI state ID/RS ID 1 . . . . TCI state ID/RS ID N).

Referring to FIGS. 7A and 7B, the processing system may configure bitmap 700*a*, 700*b* to indicate one or more cells that may result in an MPE condition, or one or more alternative beams that will avoid the MPE condition on the corresponding cells. In some implementations, the processing system may configure one or more bits in a Serving Cell ID (such as in Octet 1 (Oct1), FIGS. 7A and 7B) to indicate the occurrence of an MPE event or condition in a cell corresponding to the Serving Cell ID. In some implementations, the presence of a serving cell ID in an octet may indicate the occurrence of an MPE event or condition in the cell corresponding to the Serving Cell ID.

In some implementations, the processing system may set an AC bit to "1" (such as in Octet 1 (Oct1), FIGS. 7A and 7B) to indicate that the beam corresponding to the Serving Cell ID is available as an alternative beam. In some implementations, the processing system may set the AC bit to "0" to indicate that the no available beam corresponding to the Serving Cell ID avoids the MPE condition. In such implementations, the processing system may not include additional information related to the candidate beam. For example, if the AC bit corresponding to Serving Cell IDN (FIG. 7A) is set to "0" (FIG. 7B), the processing system may not include the additional information, such as in optional Octet OctN.

In some implementations, the processing system may use one or more reserved bits (such as from among reserved bits R1 . . . . RN) to indicate that information about a TCI state ID is included in subsequent bits (such as the bits indicated as TCI state ID/RS ID 1 . . . . TCI state ID/RS ID N). In some implementations, the processing system may use two reserved bits (such as from among reserved bits R1 . . . . RN) to indicate that information about a reference signal (RS ID) is included in in subsequent bits (such as the bits indicated as TCI state ID/RS ID 1 . . . . TCI state ID/RS ID N).

Referring to FIGS. 8A and 8B, the processing system may configure bitmap 800*a*, 800*b* to indicate a single cell that may result in an MPE condition, or an alternative beam that will avoid the MPE condition on the corresponding cells. In some implementations, the presence of a Serving Cell ID (FIGS. 8A and 8B) may indicate the occurrence of an MPE condition in a cell corresponding to the Serving Cell ID. In some implementations, the processing system may set an AC bit to “1” (FIGS. 8A and 8B) to indicate that the beam corresponding to the Serving Cell ID is an alternative beam to avoid the MPE condition. In some implementations, the processing system may set the AC bit to “0” to indicate that no available beam corresponding to the Serving Cell ID avoids the MPE condition on that cell. In such implementations, the processing system may not include additional information related to the candidate beam.

In some implementations, the processing system may use one or more reserved bits (such as from among reserved bits R1) to indicate that information about a TCI state ID is included in subsequent bits (such as the bits indicated as TCI state ID/RS ID 1 . . . . TCI state ID/RS ID N). In some implementations, the processing system may use two reserved bits (such as from among reserved bits R1) to indicate that information about a reference signal (RS ID) is included in in subsequent bits (such as the bits indicated as TCI state ID/RS ID 1 . . . . TCI state ID/RS ID N).

FIGS. 9A-11B show example configurations of beam failure recovery (BFR) information to indicate one or more cells that may result in an MPE condition, or one or more alternative beams that will avoid the MPE condition.

Referring to FIGS. 9A and 9B, the processing system may configure BFR information 900*a*, 900*b* to indicate one or more cells that may result in an MPE condition, or one or more alternative beams that will avoid the MPE condition on the corresponding cell. In some implementations, the BFR information may be BFR information for a secondary cell (such as when the UE is performing dual connectivity communications). In some implementations, the processing system may use a logical cell ID (LCID) for BFR information, or alternatively to convey information related to an MPE condition or for an alternative beam. In some implementations, the processing system may use a BFR physical uplink control channel (PUCCH) resource for BFR information, or alternatively to convey information related to a beam experiencing MPE condition or for an alternative beam.

In some implementations, the processing system may set a reserved bit, such as reserved bits R1, R2, R3 . . . . RN (FIG. 9A) to identify the information encoded in the MAC-CE. For example, the processing system may set a reserved bit to “0” (such as reserved bit R2, FIGS. 9A and 9B) to indicate that the MAC-CE includes information related to a cell experiencing MPE condition or an alternative beam. As another example, the processing system may set a reserved bit to “1” (such as reserved bit R1, FIGS. 9A and 9B) to indicate that the MAC-CE includes BFR information.

In some implementations, the processing system may set a bit (such as one of bits C0-C15) to indicate that an MPE condition is detected, or is not detected, for a cell that corresponds with the bit. In some implementations, the cell may correspond with an identifier (such as a serving cell index (ServCellIndex)) that is indicated by one of bits C0-C15. In some implementations, the processing system may set a bit to “1” to indicate that an MPE condition is detected, and to “0” to indicate that an MPE condition is not detected. In some implementations, to indicate an alternative beam the use of which will avoid the MPE condition, the processing system may set a bit (such as one of bits AC0-AC15). In some implementations, the processing system may set a bit to “1” to indicate that a beam is a viable alternative beam, and to “0” to indicate that a beam is not a viable alternative beam. For example, the processing system may set bit C1 (FIG. 9A) to “1” (FIG. 9B) to indicate that an MPE condition is detected in a corresponding cell. As another example, the processing system may set bit AC2 (FIG. 9A) to “1” (FIG. 9B) to indicate that a corresponding beam is a viable alternative beam for use in uplink communications.

In some implementations, the processing system may include information related to a TCI state or RS identifier for a corresponding beam. In some implementations, the processing system may use one reserved bit (such as reserved bits R3 . . . . RN) to indicate the inclusion of information about a TCI state ID is included. In some implementations, the processing system may use two reserved bits (such as from among reserved bits R3 . . . . RN) to indicate the inclusion of information about a reference signal (RS ID).

Referring to FIGS. 10A and 10B, the processing system may configure BFR information 1000*a*, 1000*b* to indicate one or more cells that may result in an MPE condition, or one or more alternative beams that will avoid the MPE condition. In some implementations, the BFR information may be BFR information for a secondary cell (such as when the UE is performing dual connectivity communications). In some implementations, the processing system may use a logical cell ID (LCID) for BFR information, or alternatively to convey information related to an MPE condition or for an alternative beam. In some implementations, the processing system may use a BFR physical uplink control channel (PUCCH) resource for BFR information, or alternatively to convey information related to a cell experiencing MPE condition or for an alternative beam.

In some implementations, the processing system may set a reserved bit (such as any of the reserved bits R1 . . . . RN) to identify the information encoded in the MAC-CE. For example, the processing system may set reserved bit R1 reserved bit to “0” (FIGS. 10A and 10B) to indicate that the MAC-CE includes information related to a beam experiencing MPE condition. As another example, the processing system may set a reserved bit to “1” (not illustrated) to indicate that the MAC-CE includes BFR information.

In some implementations, the processing system may set one of the bits AC1 . . . . ACN to indicate an alternative cell the use of which will avoid the MPE condition. For example, the processing system may set bit AC1 (FIG. 10A) to “1” (FIG. 10B) to indicate that a corresponding beam is usable as an alternative cell.

In some implementations, the processing system also may include additional information, such information related to a TCI state or RS identifier for a corresponding beam. In some implementations, the processing system may use one reserved bit (such as reserved bits R1 . . . . RN) to indicate that information about a TCI state ID is included in subsequent bits (such as the bits indicated as TCI state ID/RS ID 1 . . . . TCI state ID/RS ID N). In some implementations, the processing system may use two reserved bits (such as from among reserved bits R1 . . . . RN) to indicate that information about a reference signal (RS ID) is included in in subsequent bits (such as the bits indicated as TCI state ID/RS ID 1 . . . . TCI state ID/RS ID N).

In some implementations, the setting of an AC bit also may indicate whether the additional included information related to a cell experiencing an MPE condition, has an alternative beam or not. For example, an AC bit set to “1” may indicate that the additional information related to a cell experiencing an MPE condition has no available beam to avoid the MPE condition, and an AC bit set to “0” may indicate that the additional information related to a cell experiencing an MPE condition has no available beam to avoid the MPE condition. In some implementations, the additional information may include a cell identifier.

Referring to FIGS. 11A and 11B, the processing system may configure BFR information 1100*a*, 1100*b* to indicate one or more cells that may result in an MPE condition, or one or more alternative beams that will avoid the MPE condition. In some implementations, the processing system may configure the MAC-CE for “hybrid” reporting of BFR information or MPE-related information. For example, the processing system may use sets or groups of Octets (such as Octets Oct1 and Oct2) to indicate either BFR information or MPE-related information in one MAC-CE signaling. In some implementations, the processing system may set reserved bit R1 to “0” to indicate that the Octets include MPE-related information, and may set reserved bit R1 to “1” to indicate that the Octets include BFR information. In some implementations, the processing system may use another reserved bit, such as R2 or R3, for this purpose.

In some implementations, the processing system may set an AC bit to “1” (such as in Octet 1 (Oct1)) to indicate that the cell corresponding to the Serving Cell ID is available as an alternative cell. In some implementations, the processing system may set the AC bit to “0” to indicate that the cell corresponding to the Serving Cell ID is experiencing an MPE condition. In some implementations, the processing system may include additional information about the cell experiencing the MPE condition or the alternative cell, such as a TCI state ID or RS ID (for example, in Octet (Oct2)).

Referring to FIGS. 12A and 12B, the processing system may configure information related to a physical uplink shared channel (PUSCH) resource 1200*a*, 1200*b* to indicate that the PUSCH resource is communicating information about a cell or beam experiencing an MPE condition, or about an alternative beam. In some implementations, the processing system may configure bits in a bitmap to indicate MPE-related information for each TCI state for a PUSCH. In some implementations, the processing system may configure bits in a scheduling request (SR)-like PUCCH resource to convey information about a cell experiencing an MPE condition or about an alternative cell. In some implementations, the processing system may define a new logical channel ID (LCID) for the uplink MAC-CE. In some implementations, in a given Serving Cell ID or Cell ID, for each bandwidth part (BWP), the processing system may configure the PUSCH configuration with one or more bits T0 . . . T(N−2)×8+7 that each represent a state of up to 128 TCI states of the PUSCH. In some implementations, the processing system may configure a bit to indicate to indicate whether a TCI state may experience or avoid an MPE condition. For example, the processing system may set bit T0 (FIG. 12A) to “0” (FIG. 12B) to indicate that a corresponding TCI state may avoid an MPE condition. As another example, the processing system may set bit T7 (FIG. 12A) to “1” (FIG. 12B) to indicate that a corresponding TCI state may experience an MPE condition. In some implementations, the TCI state may be an uplink TCI state. In some implementations, the TCI state may be a downlink TCI state. In some implementations, the processing system may encode the PUSCH with a spatial relationship information identifier, such as a spatialrelationshipinfo ID, rather than the TCI state.

Referring to FIGS. 13A and 13B, the processing system may configure information related to a physical uplink control channel (PUCCH) resource 1300*a*, 1300*b* to indicate that the PUCCH resource is communicating information about a cell or beam experiencing an MPE condition, or about an alternative beam. In some implementations, the processing system may configure bits in a bitmap to indicate MPE-related information for each TCI state for the PUCCH. In some implementations, the processing system may define a new LCID for the uplink MAC-CE. In some implementations, in a given Serving Cell ID or Cell ID, for each bandwidth part (BWP), the processing system may configure the PUCCH resource with one or more bits S0 . . . S7 that each represent a TCI state of the PUCCH. In some implementations, the processing system may configure a bit to indicate to indicate whether a TCI state may experience or avoid an MPE condition. For example, the processing system may set bit S0 (FIG. 13A) to “0” (FIG. 13B) to indicate that a corresponding TCI state may avoid an MPE condition. As another example, the processing system may set bit S7 (FIG. 13A) to “1” (FIG. 13B) to indicate that a corresponding TCI state may experience an MPE condition. In some implementations, the processing system may encode the PUSCH with a spatial relationship information identifier, such as a PUCCH-spatialrelationshipinfo ID, rather than the TCI state.

Figures 14A, 14B:
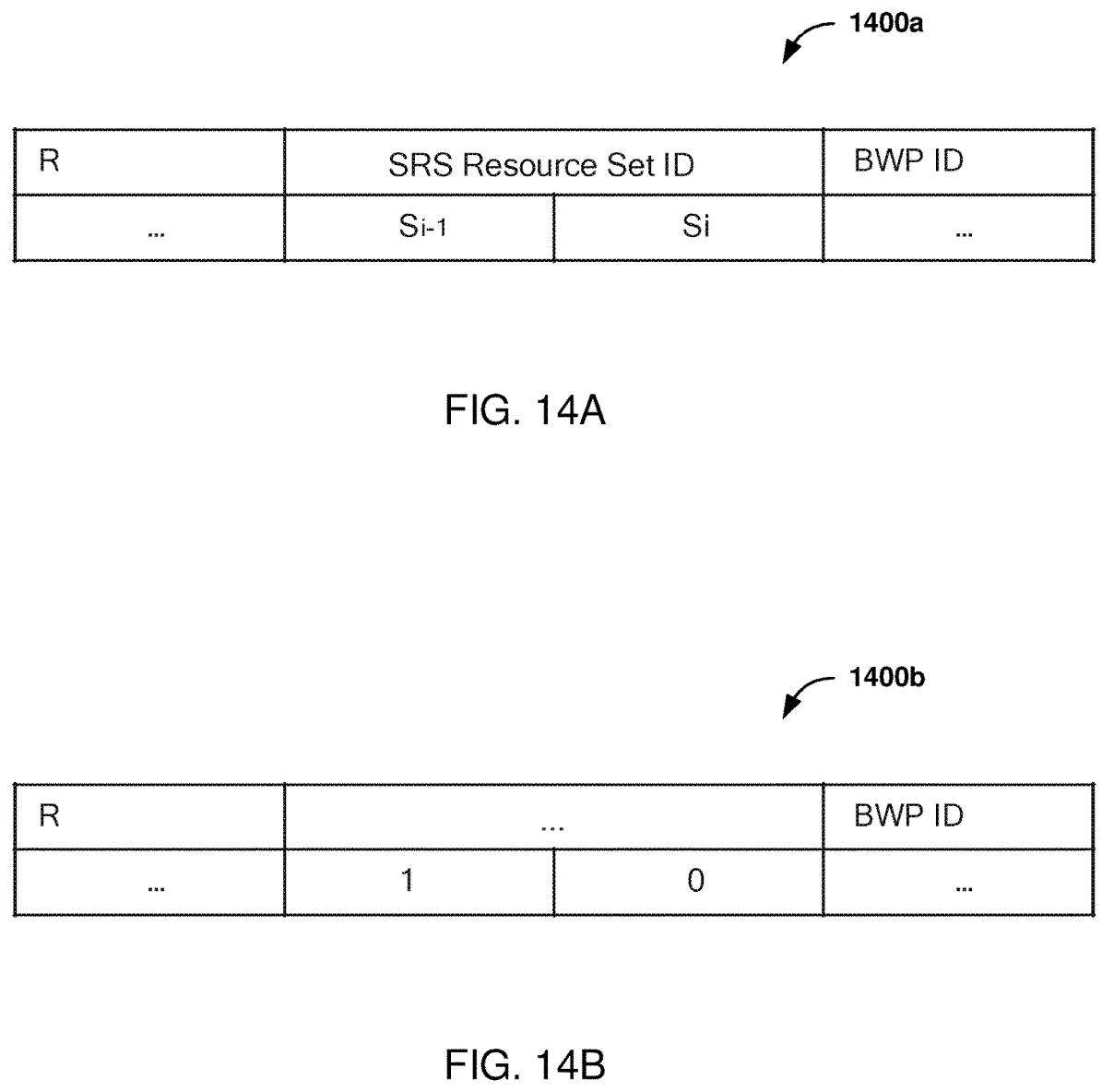

Referring to FIGS. 14A and 14B, the processing system may configure information related to an SRS resource set 1400*a*, 1400*b* to indicate that the SRS resource set is communicating information about a cell or beam experiencing an MPE condition, or about an alternative cell. In some implementations, the processing system may configure bits in a bitmap to indicate MPE-related information for each TCI state for the SRS resource set. In some implementations, the processing system may define a new LCID for the uplink MAC-CE. In some implementations, in a given Serving Cell ID or Cell ID, for each bandwidth part (BWP), the processing system may configure the SRS resource set with one or more bits S0 . . . S7 that each indicate an SRS resource ID in the SRS resource set.

In some implementations, the processing system may configure a bit to indicate to indicate whether an SRS resource corresponding to an SRS resource ID may experience or avoid an MPE condition. For example, the processing system may set bit Si (FIG. 14A) to “0” (FIG. 13B) to indicate that a corresponding SRS resource may avoid an MPE condition. As another example, the processing system may set bit Si-1 (FIG. 14A) to “1” (FIG. 14B) to indicate that a corresponding SRS resource may experience an MPE condition.

Figure 15:
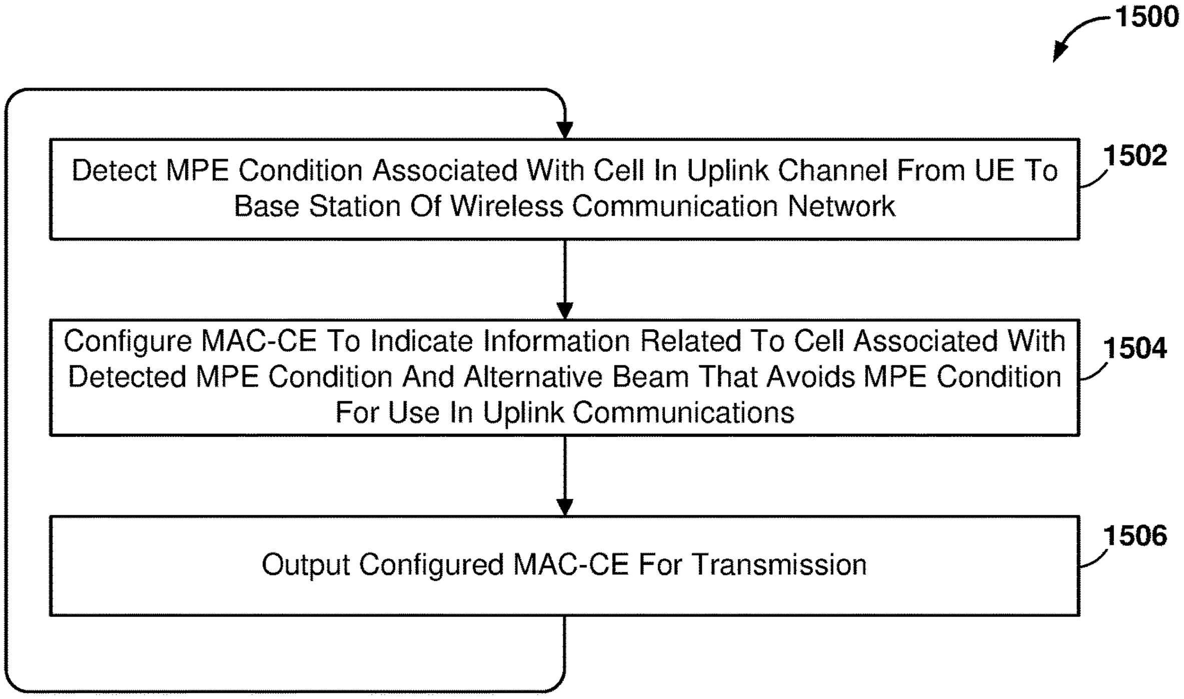
FIG. 15 shows a process flow diagram of an example method, performed by a processing system of a UE, for responding to an MPE condition in uplink communications with a wireless communication network.

FIG. 15 shows a process flow diagram of an example method 1500 for responding to an MPE condition in uplink communications with a wireless communication network. With reference to FIG. 1-15, the operations of the method 1500 may be performed by a processing system of a computing platform (such as the UE 120*a*-120*e*, 200, 320, 402).

In block 1502, the processing system may detect an MPE condition associated with a beam in an uplink channel from the UE to a base station of the wireless communication network.

In block 1504, the processing system may configure a MAC-CE to indicate information related to the beam associated with the detected MPE condition and an alternative beam that avoids the MPE condition for use in uplink communications.

In some implementations, the processing system may configure the MAC-CE message in block 1504 to include an SSBRI or a CRI that indicates an alternative UE panel or Tx beam for UL transmissions. In some implementations, the processing system may configure the MAC-CE message in block 1504 to include an SSBRI or a CRI that indicates a feasible UE panel or Tx beam for UL transmissions taking into account the detected MPE condition.

In some implementations, the processing system may configure a beam failure recovery (BFR) information for a secondary cell. The BFR information may be configured to indicate that the BFR information is communicating an MPE condition instead of signaling a BFR condition.

In some implementations, the processing system may configure a MAC-CE that includes information related to a physical uplink shared channel (PUSCH) resource. The information related to the PUSCH resource may be configured to indicate that the PUSCH resource is communicating an MPE condition.

In some implementations, the processing system may configure a MAC-CE that includes information related to a physical uplink control channel (PUCCH) resource. The information related to the PUCCH resource may be further configured to indicate that the PUCCH resource is communicating an MPE condition.

In some implementations, the processing system may configure an SRS resource set. The MAC-CE may be further configured to indicate that the SRS resource set is communicating an MPE condition.

In block 1506, the processing system may output the configured MAC-CE for transmission (for example, to a base station or another network element of the communication network).

In some implementations, the processing system may perform the operations of blocks 1502-1506 iteratively or periodically responsive to detections of MPE conditions.

Figure 16:
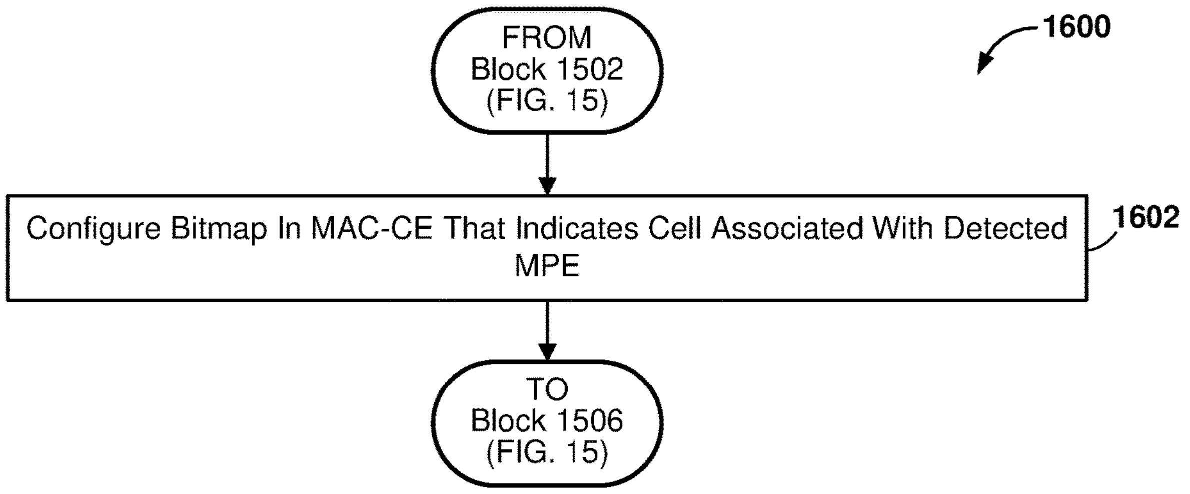
FIGS. 16 and 17 show process flow diagrams of example operations that may be performed as part of the method for responding to an MPE condition in uplink communications with a wireless communication network.

FIG. 16 shows a process flow diagram of example operations 1600 that may be performed as part of a method for responding to an MPE condition in uplink communications with a wireless communication network. With reference to FIG. 1-16, the operations 1600 may be performed by a processing system of a computing platform (such as the UE 120*a*-120*e*, 200, 320, 402).

Following the operations of block 1502 (FIG. 15), the processing system may configure a bitmap in the MAC-CE that indicates the beam associated with the detected MPE in block 1602. In some implementations, the bitmap in the MAC-CE also may indicate the alternative beam that avoids the MPE condition for use in uplink communications.

The processing system may perform the operations of block 1502 (FIG. 15) as described.

Figure 17:
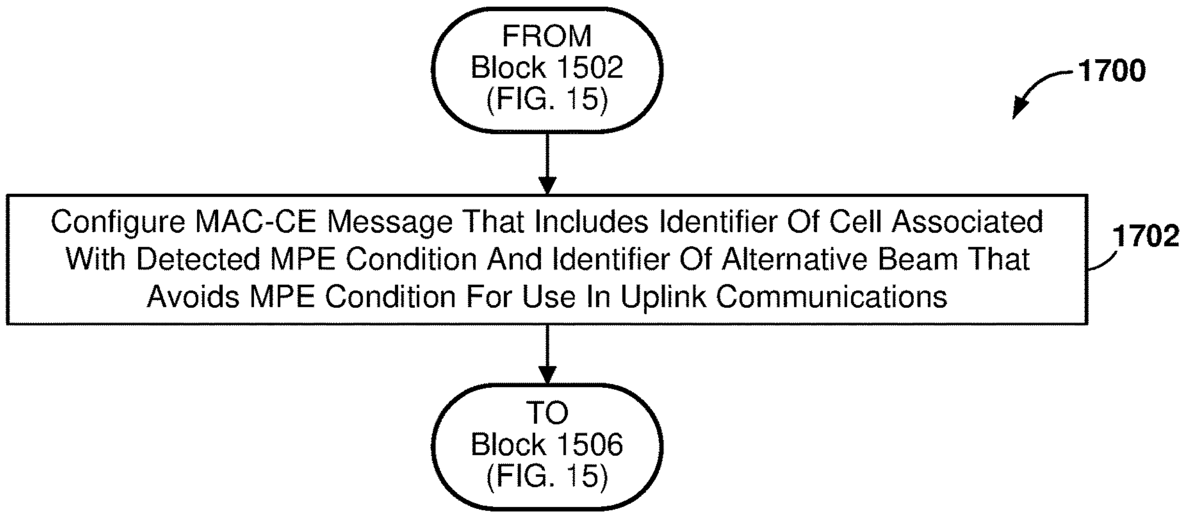

FIG. 17 shows a process flow diagram of example operations 1700 that may be performed as part of the method 1500 for responding to an MPE condition in uplink communications with a wireless communication network. With reference to FIG. 1-17, the operations 1700 may be performed by a processing system of a computing platform (such as the UE 120*a*-120*e*, 200, 320, 402).

Following the operations of block 1502 (FIG. 15), the processing system may configure a MAC-CE message that includes an identifier of the beam associated with the detected MPE condition and an identifier of the alternative beam that will avoid the MPE condition for use in uplink communications in block 1702.

In some implementations, the processing system may configure the MAC-CE message to include a synchronization signal/physical broadcast channel resource block indicator (SSBRI) or a channel state information resource indicator (CRI) that indicates an alternative UE panel or Tx beam for UL transmissions. In some implementations, the processing system may configure the MAC-CE message to include an SSBRI taking into account the detected MPE condition. In some implementations, the processing system may configure the MAC-CE message to include a channel state information resource indicator (CRI) that indicates a feasible UE panel or Tx beam for UL transmissions taking into account the detected MPE condition.

In some implementations, the processing system may configure the MAC-CE to include a beam failure recovery (BFR) information for a secondary cell. The BFR information may be configured to indicate that the BFR information is communicating an MPE condition instead of signaling a BFR condition. In some implementations, the processing system may configure the MAC-CE to include information related to a PUSCH resource. The information related to the PUSCH resource may be further configured to indicate that the PUSCH resource is communicating an MPE condition. In some implementations, the processing system may configure the MAC-CE to include information related to a PUCCH resource. The information related to the PUCCH resource may be further configured to indicate that the PUCCH resource is communicating an MPE condition. In some implementations, the processing system may configure the MAC-CE to include an SRS resource set. In some implementations, the processing system may configure the MAC-CE to indicate that the SRS resource set is communicating an MPE condition.

The processing system may perform the operations of block 1502 (FIG. 15) as described.

Figure 18:
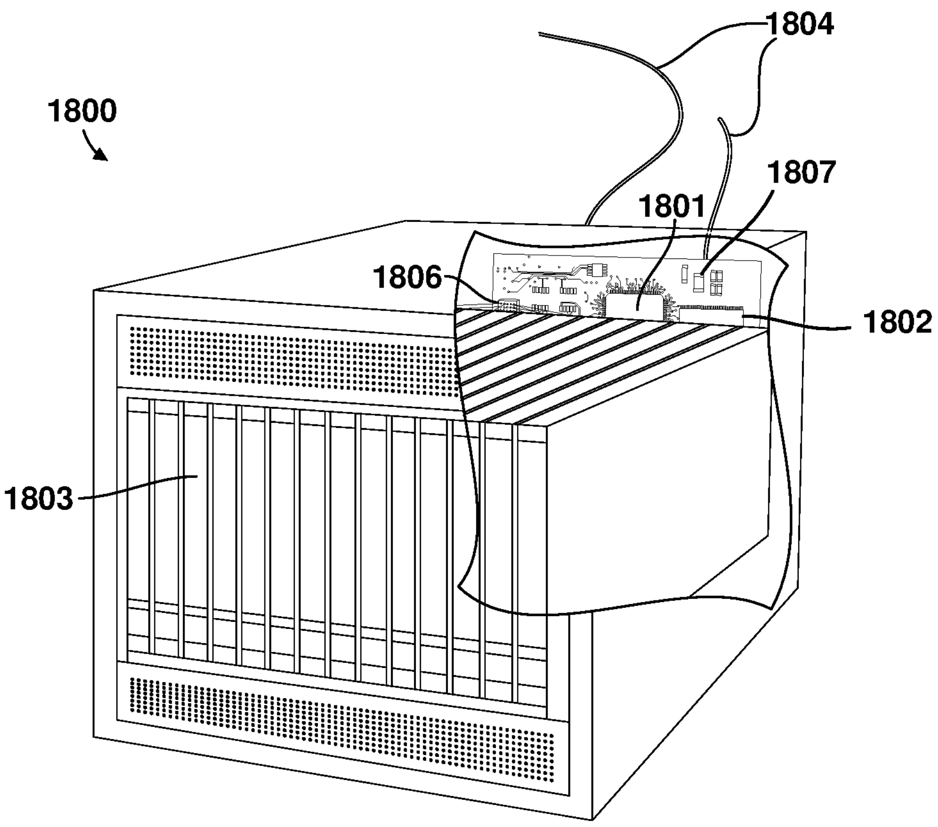
FIG. 18 shows a component block diagram of an example computing platform.

FIG. 18 shows a component block diagram of an example of a network computing device 1800 that may receive and processing MAC-CE messages from UEs indicating MPE conditions on indicated beams. With reference to FIGS. 1-18, a network computing device 1800 may function as a network element of a communication network, such as a base station. The network computing device 1800 may include a processing system 1801 coupled to volatile memory 1802 and a large capacity nonvolatile memory, such as a disk drive 1803. The network computing device 1800 also may include a peripheral memory access device such as a floppy disc drive, compact disc (CD) or digital video disc (DVD) drive 1806 coupled to the processing system 1801. The network computing device 1800 also may include network access ports 1807 (or interfaces) coupled to the processing system 1801 for establishing data connections with a network 1804, such as the Internet or a local area network coupled to other system computers and servers. The network computing device 1800 may include one or more antennas for sending and receiving electromagnetic radiation that may be connected to a wireless communication link. The network computing device 1800 may include additional access ports, such as USB, Firewire, Thunderbolt, and the like for coupling to peripherals, external memory, or other devices.

Figure 19:
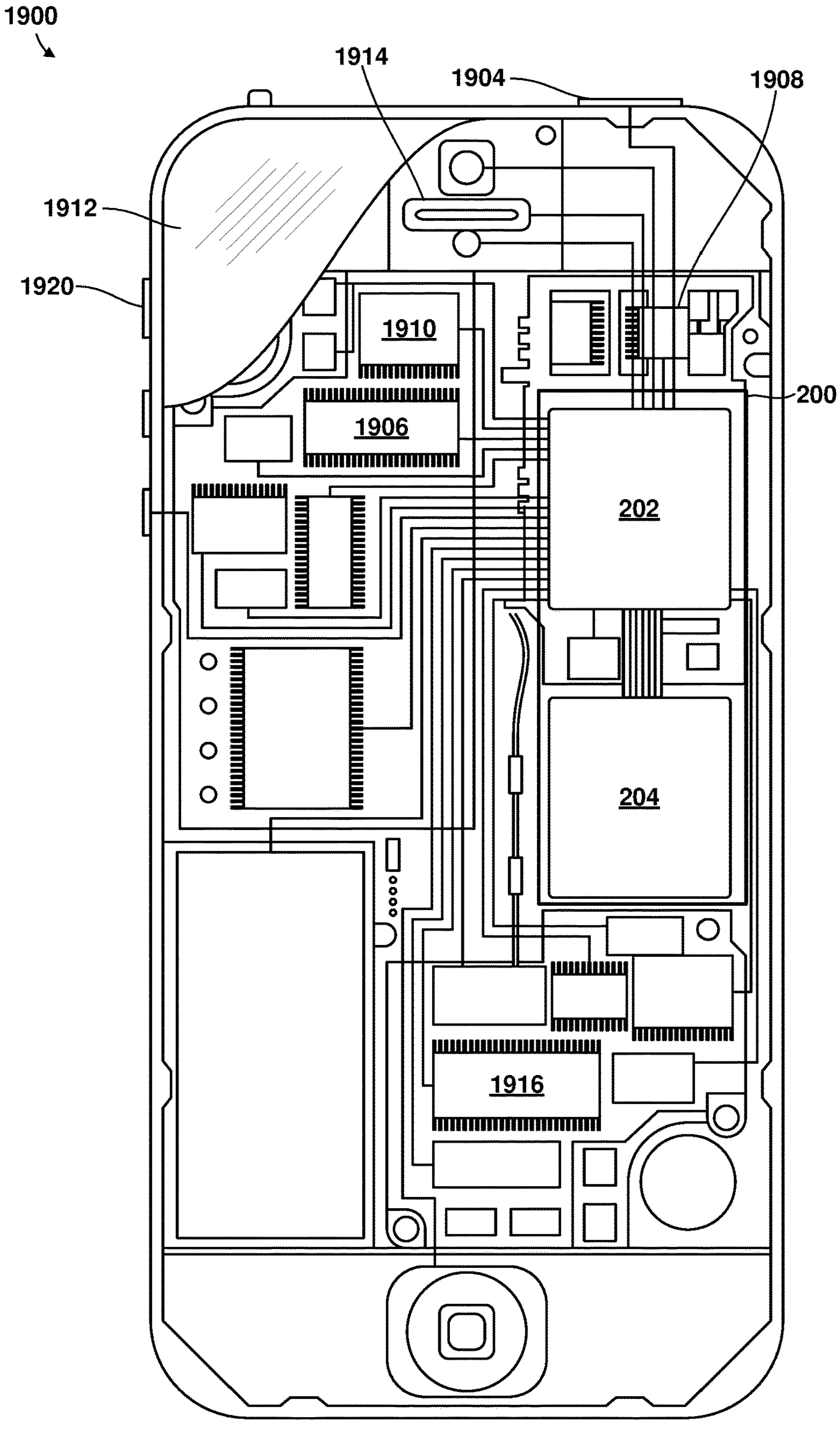
FIG. 19 shows a component block diagram of an example UE.

FIG. 19 shows a component block diagram of an example UE (such as the UE 120*a*-120*e*, 200, 320, 420) in the form of a smartphone 1900 suitable for implementing various implementations. A smartphone 1900 may include an apparatus 200 that includes a first processing system SOC 202

(such as a SOC-CPU) coupled to a second processing system SOC 204 (such as a 5G capable SOC). The first and second processing system SOCs 202, 204 may be coupled to internal memory 1906, 1916, a display 1912, and to a speaker 1914. Additionally, the smartphone 1900 may include an antenna 1904 for sending and receiving electromagnetic radiation that may be connected to a wireless data link or cellular telephone transceiver 1908 coupled to one or more processors in the first or second processing system SOCs 202, 204. Smartphone UEs 1900 typically also include menu selection buttons 1920 for receiving user inputs.

A typical smartphone 1900 also includes a sound encoding/decoding (CODEC) circuit 1910, which digitizes sound received from a microphone into data packets suitable for wireless transmission and decodes received sound data packets to generate analog signals that are provided to the speaker to generate sound. Also, one or more of the processors in the first and second processing system SOCs 202, 204, wireless transceiver 1908 and CODEC 1910 may include a digital signal processor (DSP) circuit (not shown separately).

The processing systems of the wireless network computing device 1800 and the smart phone 1900 may include any programmable microprocessor, microcomputer or multiple processor chip or chips that can be configured by processor-executable instructions to perform a variety of functions, including the functions of the various implementations described herein. In some UEs, multiple processing systems may be provided, such as one processor within a processing system SOC 204 dedicated to wireless communication functions and one processor within a processing system SOC 202 dedicated to running other applications. Typically, software applications may be stored in the memory 1906, 1916 before they are accessed and loaded into a processing system. The processing systems may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processing system, a processor, an object, an executable, a thread of execution, a program, or a computer. By way of illustration, both an application running on a UE and the UE may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processing system, or process related communication methodologies.

Implementation examples are described in the following paragraphs. While some of the following implementation examples are described in terms of example methods, further example implementations may include: the example methods discussed in the following paragraphs implemented by a UE including a processing system configured with processor-executable instructions to perform operations of the methods of the following implementation examples; the example methods discussed in the following paragraphs implemented by a UE including means for performing functions of the methods of the following implementation examples; and the example methods discussed in the following paragraphs may be implemented as a non-transitory processor-readable storage medium having stored thereon processor-executable instructions configured to cause a processing system of a UE to perform the operations of the methods of the following implementation examples.

Example 1. A method performed by a UE for responding to an MPE condition in uplink communications with a cell in a wireless communication network, including: detecting an MPE condition associated an uplink channel from the UE to the cell in the wireless communication network; configuring a MAC-CE to indicate information related to the cell associated with the detected MPE condition and an alternative beam that avoids an MPE condition for use in uplink communications; and outputting the configured MAC-CE for transmission.

Example 2. The method of example 1, where configuring the MAC-CE to indicate the detected MPE condition includes configuring a bitmap in the MAC-CE that indicates the cell associated with the detected MPE condition.

Example 3. The method of example 2, where the bitmap in the MAC-CE also indicates the alternative beam that avoids the MPE condition for use in uplink communications.

Example 4. The method of either of examples 2 or 3, where the MAC-CE includes a BFR information for a secondary cell, where the BFR information is further configured to indicate that the BFR information is communicating an MPE condition instead of signaling a BFR condition.

Example 5. The method of either of examples 2 or 3, where the MAC-CE includes information related to a physical uplink shared channel (PUSCH) resource, where the information related to the PUSCH resource is further configured to indicate that the PUSCH resource is communicating an MPE condition.

Example 6. The method of either of examples 2 or 3, where the MAC-CE includes information related to a PUCCH resource, where the information related to the PUCCH resource is further configured to indicate that the PUCCH resource is communicating an MPE condition.

Example 7. The method of either of examples 2 or 3, where the MAC-CE includes an SRS resource set, where the MAC-CE is further configured to indicate that the SRS resource set is communicating an MPE condition.

Example 8. The method of example 1, where configuring the MAC-CE to indicate the information related to the cell associated with the detected MPE condition and the alternative beam that avoids the MPE condition for use in uplink communications includes configuring a MAC-CE message that includes an identifier of the cell associated with the detected MPE condition and an identifier of the alternative Tx beam that avoids the MPE condition for use in UL communications.

Example 9. The method of example 8, where configuring the MAC-CE message that includes an identifier of the cell associated with the detected MPE condition and an identifier of the alternative Tx beam that avoids the MPE condition for use in UL communications includes configuring the MAC-CE message to include a synchronization signal/physical broadcast channel resource block indicator (SSBRI) or a CRI that indicates an alternative UE panel or Tx beam for UL transmissions.

Example 10. The method of example 8, where configuring the MAC-CE message that includes an identifier of the cell associated with the detected MPE condition and an identifier of the alternative Tx beam that avoids the MPE condition for use in UL communications includes configuring the MAC-CE message to include a synchronization signal/physical broadcast channel resource block indicator (SSBRI) or a CRI that indicates a feasible UE panel or Tx beam for UL transmissions taking into account the detected MPE condition.

Example 11. The method of example 8, where the MAC-CE is a BFR information for a secondary cell, where the BFR information is further configured to indicate that the BFR resource is communicating an MPE condition instead of signaling a BFR condition.

Example 12. The method of example 8, where the MAC-CE includes information related to a PUSCH resource, where the information related to the PUSCH resource is further configured to indicate that the PUSCH resource is communicating an MPE condition.

Example 13. The method of example 8, where the MAC-CE includes information related to a PUCCH resource, where the information related to the PUCCH resource is further configured to indicate that the PUCCH resource is communicating an MPE condition.

Example 14. The method of example 8, where the MAC-CE is an SRS resource set, where the SRS resource set is further configured to indicate that the SRS resource set is communicating an MPE condition.

A number of different cellular and mobile communication services and standards are available or contemplated in the future, all of which may implement and benefit from the various implementations. Such services and standards include, such as third generation partnership project (3GPP) LTE systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), CDMA systems (such as cdmaOne, CDMA1020™), enhanced data rates for GSM evolution (EDGE), advanced mobile phone system (AMPS), digital AMPS (IS-136/TDMA), EV-DO, digital enhanced cordless telecommunications (DECT), WiMAX, wireless local area network (WLAN), Wi-Fi Protected Access I & II (WPA, WPA2), and integrated digital enhanced network (iDEN). Each of these technologies involves, for example, the transmission and reception of voice, data, signaling, or content messages. It should be understood that any references to terminology or technical details related to an individual telecommunication standard or technology are for illustrative purposes only, and are not intended to limit the scope of the claims to a particular communication system or technology unless specifically recited in the claim language.

Various implementations illustrated and described are provided merely as examples to illustrate various features of the claims. However, features shown and described with respect to any given implementation are not necessarily limited to the associated implementation and may be used or combined with other implementations that are shown and described. Further, the claims are not intended to be limited by any one example implementation. For example, one or more of the operations of the methods disclosed herein may be substituted for or combined with one or more operations of the methods disclosed herein.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various illustrative logics, logical blocks, modules, components, circuits, and algorithm operations described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented as hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processing system, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processing system also may be implemented as a combination, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method performed at a user equipment (UE), comprising:

configuring, by the UE, a medium access control control element (MAC-CE) that indicates information related to a cell, wherein the information indicates a maximum permissible exposure (MPE) condition and an alternative beam that avoids the MPE condition, wherein the alternative beam is a candidate beam for use in communications, wherein the MPE condition is between the UE and the cell, wherein the information indicates an identifier of the alternative beam for uplink beam switching that avoids the MPE condition, and wherein the identifier of the alternative beam that avoids the MPE condition includes information related to a reference signal identifier associated with the alternative beam; and transmitting the MAC-CE for transmission.

2. The method of claim 1, wherein configuring, by the UE, the MAC-CE that indicates the information comprises configuring information related to the MPE condition in a first octet of the MAC-CE and information related to the identifier of the alternative beam in a second octet of the MAC-CE different from the first octet.

3. The method of claim 2, wherein configuring, by the UE, the MAC-CE that indicates the information comprises configuring a bit in the first octet of the MAC-CE to "1" to indicate that the MPE condition is detected and a bitmap in the second octet of the MAC-CE that indicates the alternative beam that avoids the MPE condition.

4. The method of claim 1, wherein configuring, by the UE, the MAC-CE that indicates the information comprises configuring beam failure recovery (BFR) information for a secondary cell and an indication that the BFR information is communicating the MPE condition instead of signaling a BFR condition.

5. The method of claim 1, wherein configuring, by the UE, the MAC-CE that indicates the information comprises configuring information related to a physical uplink shared channel (PUSCH) resource and an indication that the PUSCH resource is communicating the MPE condition.

6. The method of claim 1, wherein configuring, by the UE, the MAC-CE that indicates the information comprises configuring information related to a physical uplink control channel (PUCCH) resource and an indication that the PUCCH resource is communicating the MPE condition.

7. The method of claim 1, wherein configuring, by the UE, the MAC-CE that indicates the information comprises configuring a sounding reference signal (SRS) resource set and an indication that the SRS resource set is communicating the MPE condition.

8. The method of claim 1, further comprising configuring the MAC-CE to include a beam failure recovery (BFR) information for a secondary cell, the BFR information for the secondary cell including an indication that the BFR information is communicating the MPE condition instead of signaling a BFR condition.

9. The method of claim 1, further comprising configuring the MAC-CE to include information related to a physical uplink shared channel (PUSCH) resource that includes an indication that the PUSCH resource is communicating the MPE condition.

10. The method of claim 1, further comprising configuring the MAC-CE to include information related to a physical uplink control channel (PUCCH) resource that includes an indication that the PUCCH resource is communicating the MPE condition.

11. The method of claim 1, further comprising configuring the MAC-CE as a sounding reference signal (SRS) resource set that includes an indication that the SRS resource set is communicating the MPE condition.

12. The method of claim 1, wherein configuring, by the UE, the MAC-CE that indicates the information comprises:

setting two reserved bits in the MAC-CE to indicate an inclusion of the information related to the reference signal identifier associated with the alternative beam; and configuring a bit in the MAC-CE to "1" to indicate the alternative beam that avoids the MPE condition.

13. An apparatus for wireless communications, comprising:

a processing system that includes one or more processors and one or more memories coupled with the one or more processors, the processing system configured to cause a user equipment (UE) to:

configure a medium access control control element (MAC-CE) that indicates information related to a cell, wherein the information indicates a maximum permissible exposure (MPE) condition and an alternative beam that avoids the MPE condition, wherein the alternative beam is a candidate beam for use in communications, wherein the MPE condition is between the UE and the cell, wherein the information indicates an identifier of the alternative beam for uplink beam switching that avoids the MPE condition, and wherein the identifier of the alternative beam that avoids the MPE condition includes information related to a reference signal identifier associated with the alternative beam; and transmit the MAC-CE for transmission.

14. The apparatus of claim 13, wherein to cause the UE to configure the MAC-CE that indicates the information, the processing system is configured to cause the UE to configure information related to the MPE condition in a first octet of the MAC-CE and information related to the identifier of the alternative beam in a second octet of the MAC-CE different from the first octet.

15. The apparatus of claim 14, wherein to cause the UE to configure the MAC-CE that indicates the information, the processing system is configured to cause the UE to configure a bit in the first octet of the MAC-CE to "1" to indicate that the MPE condition is detected and a bitmap in the second octet of the MAC-CE that indicates the alternative beam that avoids the MPE condition.

16. The apparatus of claim 13, wherein to cause the UE to configure the MAC-CE that indicates the information, the processing system is configured to cause the UE to configure beam failure recovery (BFR) information for a secondary cell and an indication that the BFR information is communicating the MPE condition instead of signaling a BFR condition.

17. The apparatus of claim 13, wherein to cause the UE to configure the MAC-CE that indicates the information, the processing system is configured to cause the UE to configure information related to a physical uplink shared channel (PUSCH) resource and an indication that the PUSCH resource is communicating the MPE condition.

18. The apparatus of claim 13, wherein to cause the UE to configure the MAC-CE that indicates the information, the processing system is configured to cause the UE to configure information related to a physical uplink control channel (PUCCH) resource and an indication that the PUCCH resource is communicating the MPE condition.

19. The apparatus of claim 13, wherein to cause the UE to configure the MAC-CE that indicates the information, the processing system is configured to cause the UE to configure a sounding reference signal (SRS) resource set and an indication that the SRS resource set is communicating the MPE condition.

20. The apparatus of claim 13, wherein the processing system is configured to cause the UE to configure the MAC-CE to include a beam failure recovery (BFR) information for a secondary cell that includes an indication that the BFR information is communicating the MPE condition instead of signaling a BFR condition.

21. The apparatus of claim 13, wherein the processing system is configured to cause the UE to configure the MAC-CE to include information related to a physical uplink shared channel (PUSCH) resource that includes an indication that the PUSCH resource is communicating the MPE condition.

22. The apparatus of claim 13, wherein the processing system is configured to cause the UE to configure the MAC-CE to include information related to a physical uplink control channel (PUCCH) resource that includes an indication that the PUCCH resource is communicating the MPE condition.

23. The apparatus of claim 13, wherein the processing system is configured to cause the UE to configure the MAC-CE to include a sounding reference signal (SRS) resource set that includes an indication that the SRS resource set is communicating the MPE condition.

24. The apparatus of claim 13, wherein the processing system is configured to cause the UE to:

set two reserved bits in the MAC-CE to indicate an inclusion of the information related to the reference signal identifier associated with the alternative beam; and configure a bit in the MAC-CE to "1" to indicate the alternative beam that avoids the MPE condition.

25. A user equipment (UE), comprising:

a processing system that includes one or more processors and one or more memories coupled with the one or more processors, the processing system configured cause the UE to:

configure a media access control control element (MAC-CE) that indicates information related to a cell, wherein the information indicates a maximum permissible exposure (MPE) condition and an alternative beam that avoids the MPE condition, wherein the alternative beam is a candidate beam for use in communications, wherein the MPE condition is between the UE and the cell, wherein the information indicates an identifier of the alternative beam for uplink beam switching that avoids the MPE condition, and wherein the identifier of the alternative beam that avoids the MPE condition includes information related to a reference signal identifier associated with the alternative beam; and a transmitter configured to transmit the MAC-CE.

26. The UE of claim 25, wherein to cause the UE to configure the MAC-CE that indicates the information, the processing system is configured to cause the UE to configure information related to the MPE condition in a first octet of the MAC-CE and information related to the identifier of the alternative beam in a second octet of the MAC-CE different from the first octet.

27. The UE of claim 26, wherein to cause the UE to configure the MAC-CE that indicates the information, the processing system is configured to cause the UE to configure a bit in the first octet of the MAC-CE to "1" to indicate that the MPE condition is detected and a bitmap in the second octet of the MAC-CE that indicates the alternative beam that avoids the MPE condition.

28. The UE of claim 25, wherein the processing system is configured to cause the UE to:

set two reserved bits in the MAC-CE to indicate an inclusion of the information related to the reference signal identifier associated with the alternative beam; and configure a bit in the MAC-CE to "1" to indicate the alternative beam that avoids the MPE condition.

* * * * *